United States Patent
Watson

(10) Patent No.: US 11,534,672 B2
(45) Date of Patent: Dec. 27, 2022

(54) WAVE PRODUCING METHOD AND APPARATUS

(71) Applicant: 1090690 B.C. LTD., North Vancouver (CA)

(72) Inventor: James Alexander Watson, North Vancouver (CA)

(73) Assignee: KA'ANA WAVE COMPANY INC., North Vancouver (CA)

( * ) Notice: Subject to any disclaimer, the term of this patent is extended or adjusted under 35 U.S.C. 154(b) by 433 days.

(21) Appl. No.: 16/348,122

(22) PCT Filed: Nov. 8, 2017

(86) PCT No.: PCT/CA2017/051324
§ 371 (c)(1),
(2) Date: May 7, 2019

(87) PCT Pub. No.: WO2018/085924
PCT Pub. Date: May 17, 2018

(65) Prior Publication Data
US 2019/0366182 A1 Dec. 5, 2019

Related U.S. Application Data

(60) Provisional application No. 62/418,891, filed on Nov. 8, 2016.

(51) Int. Cl.
*A47K 3/10* (2006.01)
*A63B 69/00* (2006.01)
(Continued)

(52) U.S. Cl.
CPC ............ *A63B 69/0093* (2013.01); *A47K 3/10* (2013.01); *B05B 1/3402* (2018.08); *B05B 15/654* (2018.02);
(Continued)

(58) Field of Classification Search
CPC ........... A63B 69/093; A47K 3/10; E02B 3/00; A63H 23/16; E04H 4/12; E04H 4/14
(Continued)

(56) References Cited

U.S. PATENT DOCUMENTS 3,473,334 A 10/1969 Phillip
3,802,697 A 4/1974 Le Mehaute
(Continued)

FOREIGN PATENT DOCUMENTS

CA 1226104 A 9/1987
CA 2470714 A1 6/2003
(Continued)

OTHER PUBLICATIONS

Chinese National Intellectual Property Administration, First Office Action, dated Jun. 22, 2020 in Patent Application No. 201780069009.X, which is a foreign counterpart application corresponding to this U.S. Patent Application.
(Continued)

*Primary Examiner* — Sunil Singh
(74) *Attorney, Agent, or Firm* — Kolitch Romano Dascenzo Gates LLC

(57) ABSTRACT

A method and apparatus for generating a wave in a body of water may include altering a flow of water as it is urged through an inlet, contoured passage, and outlet. For example, a primary flow of water may be altered so that one or more secondary flows are created at angles to the direction of primary flow.

48 Claims, 19 Drawing Sheets

(51) Int. Cl.
  *B05B 1/34* (2006.01)
  *B05B 15/654* (2018.01)
  *F04D 29/42* (2006.01)
  *F04D 29/44* (2006.01)
  *F15D 1/00* (2006.01)

(52) U.S. Cl.
  CPC ........ *F04D 29/4293* (2013.01); *F04D 29/445* (2013.01); *F05D 2250/52* (2013.01); *F15D 1/0085* (2013.01)

(58) Field of Classification Search
  USPC .......................... 405/75–79; 4/491; 472/128
  See application file for complete search history.

(56) References Cited

U.S. PATENT DOCUMENTS

| | | | |
|---|---|---|---|
| 4,276,661 A | 7/1981 | Baker | |
| 4,558,474 A | 12/1985 | Bastenhof | |
| 4,692,949 A | 9/1987 | Dunn | |
| 4,730,807 A | 3/1988 | Miller | |
| 4,774,731 A | 10/1988 | Kodan | |
| 4,812,077 A | 3/1989 | Raike | |
| 4,905,987 A | 3/1990 | Frenzi | |
| 4,954,014 A | 9/1990 | Sauerbier | |
| 4,964,756 A * | 10/1990 | Guevel | E02B 3/062 405/26 |
| 4,999,860 A | 3/1991 | Chutter | |
| 5,098,222 A | 3/1992 | Robinson | |
| 5,171,101 A | 12/1992 | Sauerbier | |
| 5,186,578 A | 2/1993 | Perslow | |
| 5,226,747 A | 7/1993 | Wang | |
| 5,236,280 A | 8/1993 | Lochtefeld | |
| 5,271,692 A | 12/1993 | Lochtefeld | |
| 5,387,159 A | 2/1995 | Hilgert et al. | |
| 5,393,170 A | 2/1995 | Lochtefeld | |
| 5,401,117 A | 3/1995 | Lochtefeld | |
| 5,421,782 A | 6/1995 | Lochtefeld | |
| 5,564,859 A | 10/1996 | Lochtefeld | |
| 5,628,584 A | 5/1997 | Lochtefeld | |
| 5,664,910 A | 9/1997 | Lochtefeld | |
| 5,667,445 A | 9/1997 | Lochtefeld | |
| 5,738,590 A | 4/1998 | Lochtefeld | |
| 5,766,082 A | 6/1998 | Lochtefeld | |
| 5,833,393 A | 11/1998 | Carnahan | |
| 5,860,766 A | 1/1999 | Lochtefeld | |
| 5,899,633 A | 5/1999 | Lochtefeld | |
| 5,899,634 A | 5/1999 | Lochtefeld | |
| 6,019,547 A | 2/2000 | Hill | |
| 6,036,603 A | 3/2000 | Mason | |
| 6,132,317 A | 10/2000 | Lochtefeld | |
| 6,241,422 B1 | 6/2001 | Makowski | |
| 6,319,137 B1 | 11/2001 | Lochtefeld | |
| 6,336,771 B1 | 1/2002 | Hill | |
| 6,460,201 B1 | 10/2002 | Lochtefeld | |
| 6,491,589 B1 | 12/2002 | Lochtefeld | |
| 6,629,803 B1 | 10/2003 | Mcfarland | |
| 6,716,107 B2 | 4/2004 | Lochtefeld | |
| 6,912,738 B2 | 7/2005 | Black | |
| 6,928,670 B2 | 8/2005 | Lochtefeld | |
| 7,326,001 B2 | 2/2008 | Mcfarland | |
| 7,568,859 B2 | 8/2009 | Mcfarland | |
| 7,666,104 B2 | 2/2010 | Lochtefeld | |
| 7,722,291 B2 | 5/2010 | Mcfarland | |
| 7,815,396 B2 | 10/2010 | Mcfarland | |
| 8,042,200 B2 | 10/2011 | Webber | |
| 8,262,316 B2 | 9/2012 | Slater | |
| 8,303,213 B2 | 11/2012 | Mcfarland | |
| 8,434,966 B1 | 5/2013 | Mcfarland | |
| 8,496,403 B2 | 7/2013 | Lochtefeld | |
| 8,516,624 B2 | 8/2013 | Klimaschewski | |
| 8,523,484 B2 | 9/2013 | Mcfarland | |
| 8,573,887 B2 | 11/2013 | Slater | |
| 8,622,651 B2 | 1/2014 | Mcfarland | |
| 9,103,133 B2 | 8/2015 | Mcfarland | |
| 9,144,727 B2 | 9/2015 | Lochtefeld | |
| 9,194,146 B2 | 11/2015 | Murphy | |
| 9,457,290 B2 † | 10/2016 | Hill | |
| 9,649,569 B2 † | 5/2017 | Hill | |
| 2003/0009821 A1 | 1/2003 | Lochtefeld | |
| 2003/0198515 A1 | 10/2003 | Mcfarland | |
| 2005/0207845 A1 | 9/2005 | Mcfarland | |
| 2005/0226687 A1 | 10/2005 | Black | |
| 2005/0286976 A1 | 12/2005 | Lochtefeld | |
| 2006/0026746 A1 | 2/2006 | McFarland | |
| 2006/0102239 A1 | 5/2006 | Harman | |
| 2008/0060123 A1 | 3/2008 | Johnson | |
| 2008/0089744 A1 | 4/2008 | Mcfarland | |
| 2008/0101866 A1 | 5/2008 | Mclaughlin | |
| 2008/0282458 A1 | 11/2008 | Carnahan et al. | |
| 2009/0038067 A1 | 2/2009 | Johnson | |
| 2009/0169305 A1 | 7/2009 | Lochtefeld | |
| 2010/0017951 A1 | 1/2010 | Odriozola Sagastume | |
| 2010/0088814 A1 | 4/2010 | Johnson | |
| 2010/0125943 A1 | 5/2010 | Lochtefeld | |
| 2012/0020735 A1 | 1/2012 | Fricano | |
| 2012/0201605 A1 | 8/2012 | Hill | |
| 2013/0061382 A1 | 3/2013 | Fincham | |
| 2014/0000020 A1 | 1/2014 | Von Groll | |
| 2014/0105685 A1 | 4/2014 | Mcfarland | |
| 2015/0033465 A1 | 2/2015 | Lochtefeld | |
| 2015/0107013 A1 | 4/2015 | Lochtefeld | |
| 2015/0204093 A1 | 7/2015 | Smythe | |

FOREIGN PATENT DOCUMENTS

| | | |
|---|---|---|
| CN | 100491677 C | 5/2009 |
| CN | 202883502 U | 4/2013 |
| CN | 203335489 U | 12/2013 |
| CN | 203743014 U | 7/2014 |
| CN | 203926161 U | 11/2014 |
| CN | 204755417 U | 11/2015 |
| CN | 204921496 U | 12/2015 |
| DE | 2156540 A1 | 5/1973 |
| DE | 102013016307 B3 | 2/2015 |
| EP | 143612 A2 | 6/1985 |
| EP | 292605 A2 | 11/1988 |
| EP | 293831 B1 | 9/1991 |
| EP | 601641 A1 | 6/1994 |
| EP | 2634327 A2 | 9/2013 |
| EP | 2754781 A1 | 7/2014 |
| EP | 2868358 A1 | 5/2015 |
| JP | 5039134 U | 4/1975 |
| JP | S5039134 U | 4/1975 |
| JP | 5797250 U | 6/1982 |
| JP | 05202625 A | 8/1993 |
| JP | 05345070 A | 12/1993 |
| JP | 2002257675 A | 11/2002 |
| WO | 1985002449 A1 | 6/1985 |
| WO | 1990006790 A1 | 6/1990 |
| WO | 1991005170 A1 | 4/1991 |
| WO | 1993017762 A1 | 9/1993 |
| WO | 1996027319 A1 | 9/1996 |
| WO | 9641057 A1 | 12/1996 |
| WO | 1996039235 A1 | 12/1996 |
| WO | 1998017403 A1 | 4/1998 |
| WO | 2000064549 A2 | 11/2000 |
| WO | 2001008770 A1 | 2/2001 |
| WO | 2001042592 A1 | 6/2001 |
| WO | 03051479 A2 | 6/2003 |
| WO | 2005003616 A | 1/2005 |
| WO | 2006060866 A1 | 6/2006 |
| WO | 2007047000 A2 | 4/2007 |
| WO | 2008102035 A1 | 8/2008 |
| WO | 2008112123 A2 | 9/2008 |
| WO | 2009007135 A2 | 1/2009 |
| WO | 2009058031 A2 | 5/2009 |
| WO | 2009064445 A1 | 5/2009 |
| WO | 2009077036 A2 | 6/2009 |
| WO | 2009151548 A1 | 12/2009 |
| WO | 2010059871 A1 | 5/2010 |
| WO | 2011/03189 A2 | 3/2011 |
| WO | 2011/031839 A2 | 3/2011 |
| WO | 2013078502 A1 | 6/2013 |

(56) References Cited

FOREIGN PATENT DOCUMENTS

| | | |
|---|---|---|
| WO | 2014043372 A1 | 3/2014 |
| WO | 2014074664 A1 | 5/2014 |
| WO | 2015173477 A1 | 11/2015 |

OTHER PUBLICATIONS

European Patent Office, Extended European Search Report pursuant to Rule 62 EPC, dated May 15, 2020 in Patent Application No. 117869088.9, which is a foreign counterpart to this corresponding application, to which this claims priority.
P.D. Killen, Model Studies for a Wave Riding Facility, 5 pages, Aug. 1980, Post Graduate Student, University of Queensland available on the internet at: https://people.eng.unimelb.edu.au/imarusic/proceedings/7/Killen.pdf.†
P.D. Killen and R.J. Stalker, "A Facility for Wave Riding Research," 4 pages, Nov. 28/Dec. 2, 1983, Eighth Australasian Fluid Mechanics Conference, Department of Mechanical Engineering, University of Queensland, St. Lucia, QLD. 4067, Australia available on the internet at: https://people.eng.unimelb.edu.au/imarusic/proceedings/8/KillenStalker.pdf.†
Response to Office Action filed in the US Patent Office dated Jan. 21, 2015 in U.S. Appl. No. 13/361,805 (now U.S. Pat. No. 9,457,290).†
Response to Office Action filed in the US Patent Office dated Feb. 16, 2016 in U.S. Appl. No. 13/361,805 (now U.S. Pat. No. 9,457,290).†
Mark Trenner, Amendment and Response (selected pages), dated Feb. 16, 2016, 4 pages, USPTO, USPTO.†

\* cited by examiner
† cited by third party

WAVE PRODUCING METHOD AND APPARATUS

CROSS-REFERENCE TO RELATED APPLICATIONS

This application claims priority from U.S. provisional patent application Ser. No. US62/418,891 filed on Nov. 8, 2016 entitled WAVE PRODUCING METHOD AND APPARATUS, which is expressly incorporated herein, to the fullest extent permitted by law.

BACKGROUND

Field

The present disclosure is directed to methods and apparatus for producing waves, for example in a body of water. More specifically, producing waves suitable for surfing and/or for use as feature in lakes, pools, ponds, fish tanks and other water bodies.

Description of Related Art

Ways for producing waves, for example in bodies of water, are well known. For example, in the application of generating surf-able waves in a pool or natural body of water there are a number of conventional approaches commonly deployed. A common shortcoming of these conventional approaches is that they are not capable of generating high quality surf-able waves and/or are not economically viable in most situations.

Ways, such as described in U.S. Pat. Nos. 5,564,859 and 6,132,317 of Lochtefeld, and U.S. Pat. No. 4,792,260 of Sauerbier, generate a sheet flow of water that is too thin to be surfed in a manner that one would surf a naturally occurring wave, so are not capable of producing high quality surf-able waves.

Ways, such as described in U.S. Pat. No. 8,602,684 of Aufleger et al. and U.S. Pat. No. 7,658,571 of McFarland, require the construction of a costly custom built facility that has little use other than for the intended purpose of generating surf-able waves. This shortcoming reduces the economic feasibility and increases the economic risk of constructing such a facility.

Ways such as described in U.S. Pat. No. 8,042,200 of Webber, U.S. Pat. No. 8,573,887 of Slater et al., and U.S. Pat. No. 8,366,347 of Sagastume, require too large a land footprint and/or require the construction of a purpose-built water body. This shortcoming reduces the economic feasibility and increases the economic risk of constructing such a facility.

Thus, a new and inventive approach would be capable of, but not limited to, producing a high quality surf-able wave, while operating continuously to reduce the required footprint, and could be introduced into a variety of water bodies to eliminate the burden of constructing a costly dedicated facility, and would be capable of scaling in size, so that a small wave generator could be purchased and introduced into a small body such as a community swimming pool and a large wave generator could be purchased and introduced into a larger body of water, such as found in a theme park.

SUMMARY

The present disclosure is directed to a new and inventive approach that has advantages over the state of the art. In this new approach a desirable wave is generated in a body of water by altering a flow of water as it is urged through an apparatus comprised of an inlet, contoured passage, outlet, and outer shell.

Accordingly, a variety of naturally and non-naturally occurring wave forms can be simulated, including but not limited to: hydraulic jumps; left, right, and peak breaking waves that can plunge to form barrels; or left, right, and peak breaking waves that can roll over the back of the wave to form fun waves or beginner waves.

According to an exemplary feature of the invention, a flow of water is altered as it is urged through the active edges and surface contours that comprise the inlet, passage, and outlet.

Accordingly, the generated wave characteristics can be modified by altering the active edges and surface contours of the inlet, passage, and outlet.

Accordingly, the apparatus or parts thereof, can be designed to be rigid or can be designed to be adjustable, allowing for modification of the wave form while a flow is urged through the active edges and surface contours of the apparatus.

Accordingly, the generated wave characteristics can also be modified by enabling the entirety of the apparatus to pivot smoothly within a range of motion.

According to an exemplary feature of the invention, in some exemplary embodiments, the active edges and surfaces that make up the inlet, passage, and outlet, or parts thereof, are designed in accordance with geometries found in nature, for example the geometries of the interior edges and surfaces of shells such as that of the phylum Mollusca; Gastropoda, or Cephalopoda.

Accordingly, in some exemplary embodiments, the active edges and surfaces that make up the inlet, passage, and outlet, or parts thereof, are designed in accordance with the geometry of the golden section.

According to an exemplary feature of the invention, the apparatus can be designed so that the inlet, passage, and outlet, or parts thereof, can be bounded on all sides, for example for use in pressurized embodiments of the invention, or can be unbounded, for example, for use in embodiments of the invention where the apparatus is urged through a body of water, where that apparatus is stationary in a river flow, or where the apparatus is stationary in a tidal flow.

According to an exemplary feature of the invention, the apparatus can be designed to be partially submerged or fully submerged in a water body, so that no part of the apparatus extends above the surface of the water body.

According to an exemplary feature of the invention, a wave form can be generated to include features, for example, such as a shoulder, crest, lip, barrel, trough, face, and break zone.

According to an exemplary feature of the invention, the primary flow of water through the apparatus is altered so that one or more secondary flows are created at angle to the direction of primary flow.

Accordingly, the flow can be altered so that the flow resembles a horizontal ring vortex or spiral fluid pathway.

Accordingly, the flow can be altered so that the flow resembles a horizontal ring vortex or spiral fluid pathway, where a portion of the flow path, directed into or partially into the primary direction of flow, is altered to spiral from the outer trough boundary, up the face, and barrel over the wave form, finally plunging into the break zone, completing almost one full spiral rotation, as the flow moves away from the apparatus, forming the inside of the wave's barrel form; and another portion of the flow path, directed into or partially into the primary direction of flow and into the direction of the first altered flow path, is altered to spiral from the trough boundary, up the back wall, over the shoulder and crest, to barrel over the wave form, finally plunging into the break zone, completing almost one full spiral rotation, as the flow moves away from the apparatus, forming the outside of the wave's barrel form.

Accordingly, the flow can be altered, as described above, without barreling over the wave form, but instead, altered so that the flow path that comprises the inside of the barrel, overpowers the flow path that comprises the outside of the barrel form, allowing the inside barrel flow to flow over the back of the wave form.

Accordingly, the flow can be altered to intersect with itself, as described above, without resembling a ring vortex or spiral fluid pathway.

According to an exemplary feature of the invention, both a continuous and a non-continuous wave can be generated, to suite the requirements of an exemplary embodiment.

According to an exemplary feature of the invention, a flow of water may be urged through the apparatus, while the apparatus remains stationary in a body of water, thereby, creating a stationary wave.

According to an exemplary feature of the invention, the apparatus may be urged through a though a body of water, thereby generating a wave that moves in a direction, relative to a stationary shoreline.

According to an exemplary feature of the invention, the method for creating waves allows that the invention can be introduced into a variety of water bodies, so that a facility need not be constructed solely to accommodate the invention.

According to an exemplary feature of the invention, the apparatus is scalable in size, for example, so that a very large wave can be created in a large body of water, for example a lake, so that a smaller wave can be created in a smaller body of water, for example a swimming pool, or so that a very small wave can be created in a very small body of water, for example in a fish tank, for feature as well as aeration of the tank's water, and in conjunction with a fish tank pump.

According to an exemplary feature of the invention, a flow of water may be urged through the apparatus in a number of ways.

Stationary & Continuous—Flow Furnished by a Pump

Accordingly, an exemplary embodiment of the invention is to use a pump to urge a continuous flow of water through the apparatus, creating a continuous high quality, stationary wave that is able to operate in a body of water that is small relative to the wave size generated.

Accordingly, in this embodiment, a chamber can connect the apparatus to the pump and can be configured in a way that converts the turbulent pump flow into laminar flow, prior to reaching the inlet of the apparatus.

Accordingly, this exemplary embodiment allows that the apparatus can be introduced into a variety of existing water bodies, for example, local community pools, thereby making the experience of surfing accessible to people who would not otherwise, have had the chance to experience.

Accordingly, this exemplary embodiment allows that the apparatus can be easily transported from one body of water to another, so that for example, in a lowly populated area where building a full-time surf facility is not feasible, an apparatus can be utilized for a short period of time and then be relocated to another community.

Accordingly, this exemplary embodiment allows for the apparatus to be manufactured and installed at a lower cost than the state of the art.

Accordingly, this exemplary embodiment allows for the apparatus to be scaled in size to produce waves for use as feature in lakes, pools, ponds, fish tanks and other water bodies.

Stationary & Continuous or Non-Continuous—Flow Furnished by Natural Current

According to an exemplary embodiment of the invention, a continuous or non-continuous flow of water is urged through the apparatus by force of nature, for example, by force of tidal energy or by force of gravity.

Accordingly, in one example of this embodiment, the apparatus is installed in a breakwater or surge channel and may be fitted with a one-way flap valve, allowing a surge of water to be urged through the apparatus, thereby, generating a surf-able wave a calmer volume of water, for example such as a harbour.

Accordingly, in another example of this embodiment, the apparatus is installed in a river and at least a portion of the river's flow is urged through the apparatus, thereby generating a surf-able wave down stream of the apparatus.

Accordingly, in this embodiment, the apparatus' passage may be unbounded so that a portion of the river's flow passes by the apparatus, remaining unaltered by the apparatus.

Accordingly, in yet another example of this embodiment, the apparatus is connected to the outlet of a dam's spillway, and utilizes the force of gravity urge a flow through the spillway, into the inlet, through the passage, and out the outlet of the apparatus.

Accordingly, a benefit to this embodiment, once installed, the apparatus is able to generate surf-able waves that require little or no energy and associated cost to operate.

Stationary & Non-Continuous—Flow Furnished by Displacement

According to an exemplary embodiment of the invention, a non-continuous flow of water is forced through the apparatus, either pneumatically or hydraulically by displacing a volume of air or water from a chamber through the apparatus.

Accordingly, a benefit to this embodiment would be the ability to retrofit existing pneumatic or hydraulic wave generating facilities with the apparatus so that a variety of higher quality waves could be generated, while utilizing existing infrastructure.

Non-Stationary & Continuous or Non-Continuous—Urged Through a Body of Water

According to an exemplary embodiment of the invention, a continuous or non-continuous flow of water is urged through the apparatus as the apparatus is urged through a body of water, for example, like a hull moving through a body of water.

Accordingly, the apparatus may be urged linearly along a straight track to create a non-stationary & non-continuous wave; or may be urged around the inside or outside circumference of a circular or doughnut shaped water body, to create a non-stationary and continuous wave.

Accordingly, an unbounded embodiment of the apparatus may be beneficial in this embodiment.

Accordingly, a benefit to this embodiment over the state of the art, is that the wave generated by the apparatus is not dependant on a specially designed bottom contour in the water body. Removing this dependency reduces the costs of installation, as the requirement for a custom designed and constructed water body is removed; the apparatus is able to be installed in an existing body of water, for example such as a lake.

In furtherance of the foregoing, according to one aspect of the present invention there is provided a method for generating a wave in a body of water comprising: urging water to flow through an inlet, a contoured passage and an outlet of an apparatus, and altering a flow of the water with at least one of active edges and active surfaces of at least one of the inlet, the contoured passage and the outlet, whereby the water flows out of the outlet in a wave form. Altering the flow may include altering the flow with active edges and surfaces of an outer shell that encases the inlet, contoured passage, and outlet. Urging water through the contoured passage may include urging water through a plurality of inlets, a plurality of internal passages, and a plurality of outlets. The method may further include controlling the flow with a flow control value.

The method may further include modifying the generated wave form by: varying the volume of flow that is urged through, adjusting active edges and surfaces, articulating the apparatus in at least one direction, or a combination of the foregoing.

The method may further include at least partially submerging the apparatus in a water body and modifying the generated wave form through interaction with the water body.

Altering the flow may include altering the flow with a bounded active surface of the passage, wherein the entirety of the flow passes through the passage, or altering the flow with an unbounded active surface of the passage, wherein a portion of the flow is altered as it passes through the passage and another portion of the flow passes by unaffected and unaltered.

Urging may include: urging at least a portion of a primary flow through the active edges and surfaces of the apparatus which are configured to alter a portion of the primary flow into becoming the face and trough of the wave form, urging at least a portion of the primary flow through the active edges and surfaces of the apparatus which are configured to alter a portion of the primary flow into becoming the back of the wave form, urging at least a portion of the primary flow through the active edges and surfaces of the apparatus which are configured to alter a portion of the primary flow into becoming the shoulder of the wave form, or urging at least a portion of the primary flow through the active edges and surfaces of the apparatus which are configured to alter a portion of the primary flow into becoming the outer trough boundary of the wave form.

Altering may include altering with active edges and surfaces of the outer shell that are configured to obstruct unwanted flow of the water body from impeding the output flow of the apparatus, altering with active edges and surfaces of the outer shell that are configured to aid in achieving a desired output flow of the apparatus, altering by active edges and surfaces that make up the inlet, passage, and outlet, or parts thereof, which are designed in accordance with the geometry of a logarithmic spiral, altering by active edges and surfaces that make up the inlet, passage, and outlet, or parts thereof, which are designed in accordance with geometries of the interior edges and surfaces of shells selected from the phylum Mollusca; Gastropoda, Bivalvia or Cephalopoda, or altering by active edges and surfaces that make up the inlet, passage, and outlet, or parts thereof, which are designed in accordance with the geometry of the golden section.

Urging may include urging at least a portion of the primary flow through active edges and surfaces that are configured to alter the flow so that at least one secondary flow is created at angle to the direction of primary flow, urging at least a portion of the primary flow through active edges and surfaces that are configured to alter the flow so that the flow resembles a horizontal ring vortex or spiral fluid pathway. Urging may include urging at least a portion of the primary flow through the active edges and surfaces of the apparatus and displacing a volume of the water body as the flow exits the outlet and interacts water body so that a hydraulic jump is generated in the water body, urging at least a portion of the primary flow through the active edges and surfaces that are configured to urge a portion of the primary flow into the form that comprises up the outer barrel flow path, which plunges over the inner barrel flow path or face and trough of the wave form, and into the break zone, urging at least a portion of the primary flow through the active edges and surfaces that are configured to alter the flow so that the flow path that comprises the inside of the barrel, overpowers the flow path that comprises the outside of the barrel form, generating a wave form that does not have a barrel, urging a continuous flow of water through the apparatus, urging a non-continuous flow of water through the apparatus, urging the flow of water through the apparatus while the apparatus remains stationary in a body of water, urging a flow of water through the apparatus as the apparatus is moved through a body of water, urging by pumping, urging by gravity, urging by tidal energy, urging by a current in the water body, urging a non-continuous flow by fluid displacement from a chamber, urging by moving the apparatus linearly though a body of water, urging by moving the apparatus linearly around the inside or outside circumference of a ring-shaped water body, or urging from a chamber having a chamber inlet and a chamber outlet.

Altering may include altering by the section of the chamber nearest the outlet which is formed in the shape of a curve, altering with a bank of matrix capillaries within the chamber, wherein the inside capillary diameter of each capillary is less than the mean coil diameter of the chamber's curve, altering with matrix capillaries having an inside capillary diameter of between $\frac{1}{5}$th and $\frac{1}{50}$th of the mean coil diameter of the chamber's curve, altering with the active surfaces of the chamber, or parts thereof, which are designed in accordance with the geometries of the interior and or exterior edges of shells, selected from the phylum Mollusca; Gastropoda, Bivalvia, or Cephalopoda, altering with the active surfaces of the chamber, or parts thereof, which are designed in accordance with the geometry of the golden section, altering with the chamber, or parts thereof, which are designed in accordance with the geometry of a logarithmic spiral.

The method may further include: drawing a flow of water from the water body into the chamber; urging the flow through the chamber wherein turbulent draw flow is made laminar; and urging the flow out of the chamber into the inlet. The method may further include adjusting the height of the apparatus relative to the water body surface, articulating the apparatus in at least one direction, or adjusting the height of the apparatus relative to the water body surface and articulating the apparatus in at least one direction.

According to another aspect of the present invention, there is provided an apparatus for generating a wave in a body of water comprising: an inlet configured to receive a primary flow, an outlet configured to discharge a wave form, and a passage connecting the inlet to the outlet, wherein at least one of the inlet, the outlet and the passage is configured to alter the primary flow into the wave form.

The apparatus may further comprise an outer shell that encases the inlet, the passage, and the outlet.

The passage may comprise a plurality of passages connecting the inlet to the outlet, the outlet may comprise a plurality of outlets, and the inlet may comprise a plurality of inlets. The passage may be connected to a flow control value.

The apparatus, or parts thereof, may be: rigid and/or adjustable. The apparatus may: articulate in at least one direction, be at least partially submergible in a water body, and/or be scalable in size.

At least one of the inlet, the outlet and the passage may have bounded active edges and surfaces. At least one of the inlet, the outlet and the passage may have unbounded active edges and surfaces. The active edges and surfaces may be configured to alter a portion of the primary flow into becoming the face and trough of the wave form.

The active edges and surfaces may comprise: an inlet edge; an outlet edge, and a passage surface connecting the inlet to the outlet. The apparatus may further include a passage profile, wherein the outlet edge is curved in toward the passage profile. The curvature of the passage surface may diminish or increase as it moves away from the outlet. The active surface of the passage may follow a curved path from the inlet to the outlet. The active edges and surfaces may be configured to alter a portion of the primary flow into becoming the back of the wave form, the shoulder of the wave form, or the outer trough boundary of the wave form.

The outer shell may have additional active edges and surfaces which are configured to obstruct unwanted flow of the water body from impeding the output flow of the apparatus or configured to aid in achieving a desired output flow of the apparatus. The active edges and surfaces, or parts thereof, may be designed in accordance with the geometry of a logarithmic spiral, the geometries of the interior edges and surfaces of shells selected from the phylum Mollusca; Gastropoda, Bivalvia or Cephalopoda, or the geometry of the golden section.

The active edges and surfaces that may be configured to alter the flow so that at least one secondary flow is created at angle to the direction of primary flow. In this regard, the active edges and surfaces that may be configured to: alter the flow so that the flow resembles a horizontal ring vortex or spiral fluid pathway, alter the flow so that a hydraulic jump is generated in the water body as the flow exits the outlet and interacts water body, urge a portion of the primary flow into a form that comprises an outer barrel flow path that plunges over an inner barrel flow path or face and trough of the wave form, and into a break zone, or alter the flow so that the flow path that comprises the inside of a barrel, overpowers the flow path that comprises the outside of a barrel form, generating a wave form that does not have a barrel.

The inlet may be adapted to receive a continuous flow of water or a non-continuous flow of water.

The apparatus may be configured to receive at the inlet a flow of water while the apparatus remains stationary in a body of water or receive at the inlet a flow of water as the apparatus is urged through a body of water. In this regard, the flow of water received at the inlet may be provided by a pump. The apparatus may be installable in a river, such that flow of water received at the inlet may be provided by the river's flow. The apparatus may be installable in a breakwater and further include a one-way flow control valve. The apparatus may be connectable to a spillway outlet of a dam, and the flow of water received at the inlet provided by the spillway. The apparatus may be connectable to a chamber and the flow of water received at the inlet be non-continuous and provided either pneumatically or hydraulically by forcing a volume of air or water from the chamber through the apparatus.

The apparatus may further include means for urging the apparatus linearly though a body of water or means for urging the apparatus around the inside or outside circumference of a ring-shaped water body.

The apparatus may further include a chamber having a chamber inlet and chamber outlet, wherein the apparatus inlet connects to the chamber outlet. The section of the chamber nearest the chamber outlet may be formed in the shape of a curve. The chamber may contain a bank of matrix capillaries wherein the inside capillary diameter of each capillary is less than of the mean coil diameter of the chamber's curve. The inside capillary diameter of each capillary in the matrix capillaries may be between $\frac{1}{2}$ and $\frac{1}{50}$ of the mean coil diameter of the chamber's curve. The matrix capillaries may take the form of a honeycomb.

The active surfaces of the chamber, or parts thereof, may be designed in accordance with the geometries of the interior and or exterior edges of shells, selected from the phylum Mollusca; Gastropoda, Bivalvia, or Cephalopoda, the geometry of the golden section, or the geometry of a logarithmic spiral.

The apparatus may further comprise a water pump with discharge column, having an intake and outlet, wherein at least the intake resides in a body of water. The apparatus may further comprise a mechanism for adjusting the height of the chamber.

The chamber may further comprise a ball joint mechanism having a ball and a socket. The chamber may further comprise a height adjustment mechanism and a ball joint mechanism having a ball and a socket. The socket may be attached to the chamber and contain a plurality of ducts which allow a pressurized flow from the chamber to be directed at the ball, creating a thin film of water between the surfaces of the ball and socket.

Additional aspects, features and benefits will become evident from the flowing detailed description and drawings of non-limiting, exemplary, embodiments.

DESCRIPTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

All headings in this specification are provided only for convenience, and are not intended to be limiting.

DETAILED DESCRIPTION OF SPECIFIC EMBODIMENTS

Overview

Figure 1:
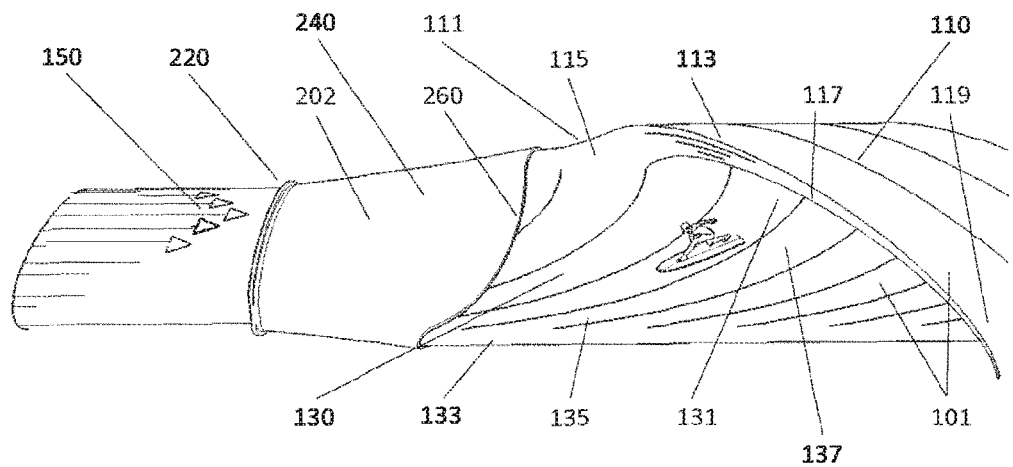
FIG. 1 is an elevated side view illustrating a primary flow into and altered flow out of an example apparatus.

It is observable that at times, without a clear frame of reference, it can be impossible for an observer to distinguish whether it is they, the observer, that is in motion or it is the observed that is in motion, relative to the observer.

An Analogy to illustrate this concept: A camera affixed to a drone, filming a surfer's contest run, follows the surfer at a constant rate to capture the surfer's run. In the camera's frame, only the sky, wave, and surfer can be seen. The wave is breaking at a constant rate, there are no clouds in the sky, and the beach is out of the frame. It can be said that without these features, there are no clear points of reference. When viewing the footage, it becomes impossible to distinguish whether the surfer is moving left relative to the beach or whether the surfer is stationary relative to the beach and it is the water that is flowing from left to right, relative to the beach.

When the clear frame of reference is removed, all that remains is a surfer moving relative to a flow of water that is moving in a direction; left to right. Remove the surfer and all that remains is a flow of water that is moving left to right.

further the analogy, the surfer's wave is a plunging wave with a clean face and barrel. To an observer on the beach, with the naked eye, the water appears to be moving from the trough, up the face of the wave, barreling over the face and trough, and into the break zone in a cylindrical manner, completing almost one full rotation, as it does so. To the camera which is moving at the same rate as the breaking wave, this cylindrical motion up the face of the wave, becomes a spiraling motion, completing almost one full spiral rotation, from the trough to break zone.

When the clear frame of reference is again removed, all that remains is a surfer moving relative to a flow of water that is spiraling from the trough, up the face, over the barrel, and into the break zone, as it moves from left to right, completing almost one full spiral rotation, from trough to break zone.

Remove the surfer, and all that remains is a flow of water that is spiraling from the trough, up the face, over the barrel, and into the break zone, as it moves from left to right, completing almost one full spiral rotation, from the trough to break zone.

It is an object of this method and apparatus to simulate the flow of water, relative to the surfer, as described throughout this specification, regardless of whether it is the apparatus moving through a stationary body of water or whether it is a flow of water moving through a stationary apparatus.

An additional analogy can be used to help to illustrate how the active edges and surfaces of the apparatus function to achieve the described flow of water.

Through experimentation and discovery, it is observed that a single flow of water in a passage can be altered to create secondary flows relative to the primary direction of flow. Such an alteration of flow can be illustrated with the analogy of holding one's thumb over the outlet of a hose. In this analogy, the outlet edge of the hose is malleable so that the alteration of flow is dictated not just by the positioning of the thumb over the outlet, but also by the pressure applied to the outlet's edge. In this analogy, applying pressure to the outlet edge of the hose not only changes the shape of the outlet edge, resulting in a change to the shape of the output flow, but also changes the shape of the internal active surface of the hose, in turn, changing the path of flow. As the outlet's edge is depressed into the flow path, the internal active surface of the hose is modified to obstruct the primary, forcing the water to flow around the obstruction and into the primary flow path. This observation and analogy is provided to aid in illustrating how the shape of the outlet edges function to create the shape of the wave form and how the contours of the passage function to alter the primary flow path to generate the flow paths that make up the wave form.

List of Elements

101 The wave form
   110 Outer Barrel Flow Path
     111 Shoulder

-continued

List of Elements

Figure 2:
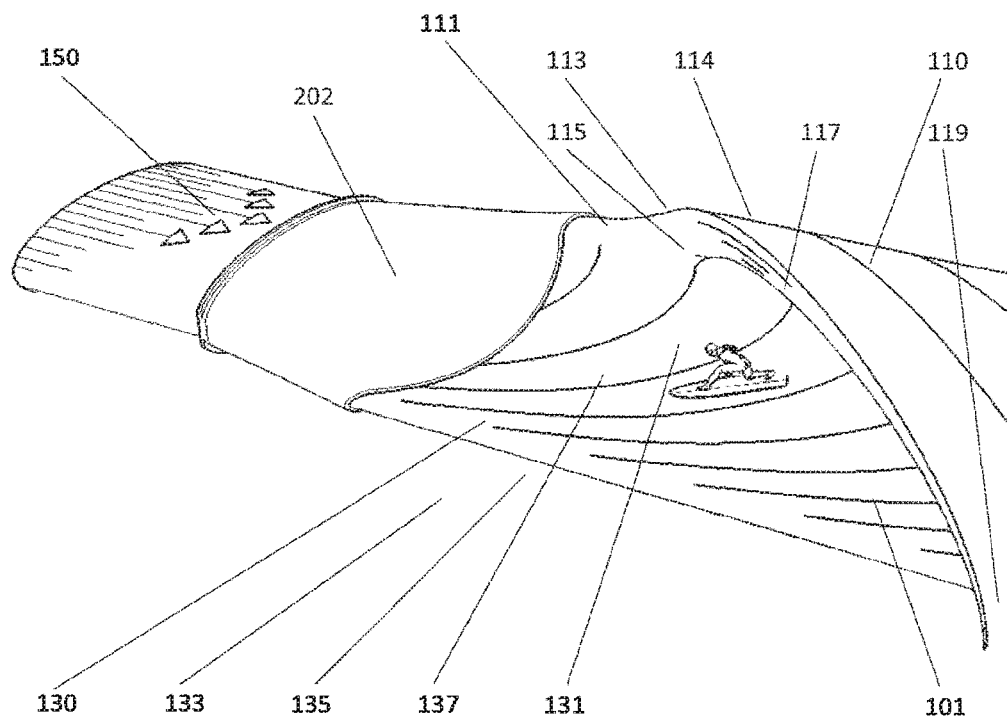
FIG. 2 is a perspective view illustrating primary flow into and altered flow out of the example apparatus.
Figure 3:
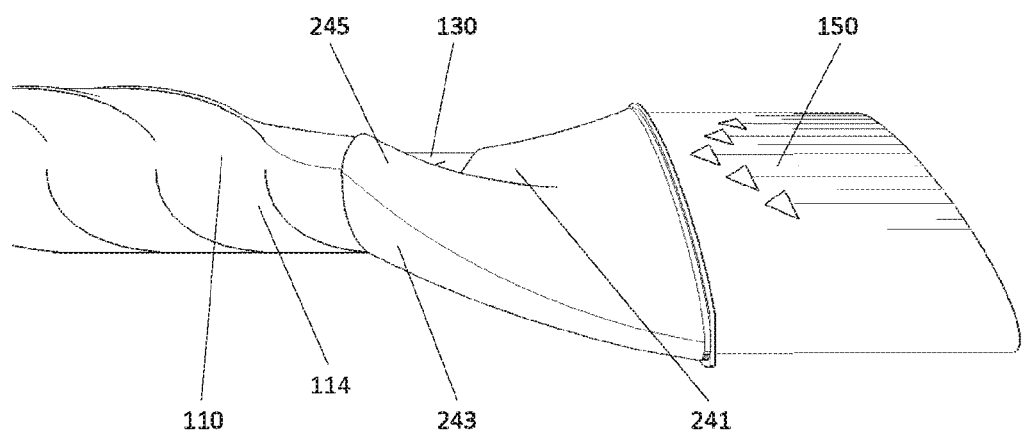
FIG. 3 is an elevated side view illustrating primary flow into and altered outer barrel flow out of the example apparatus.
Figure 4:
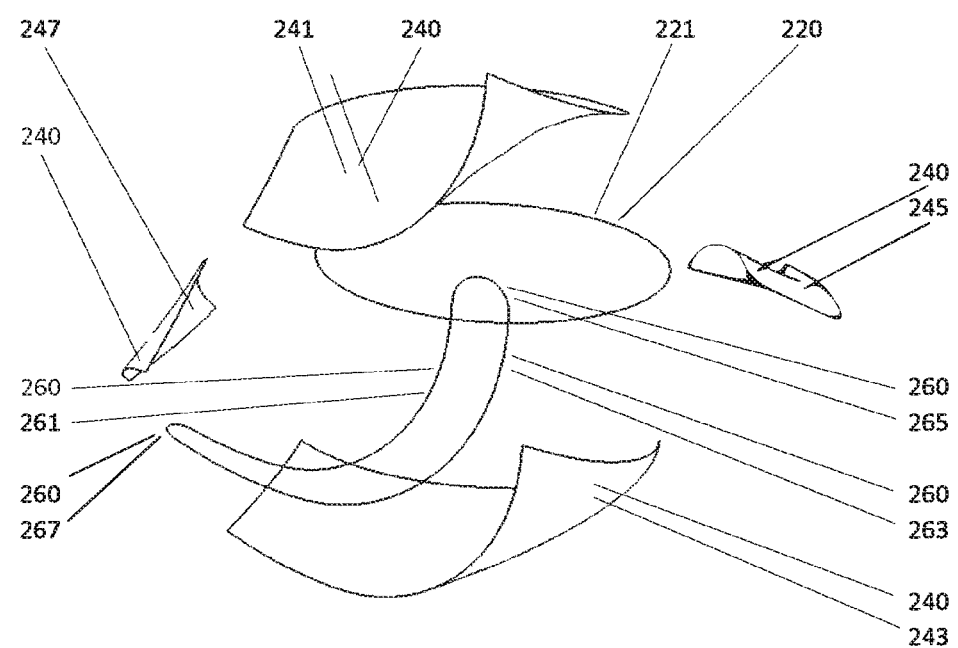
FIG. 4 is an exploded perspective view illustrating the active edges and surfaces of the example apparatus.
Figure 5:
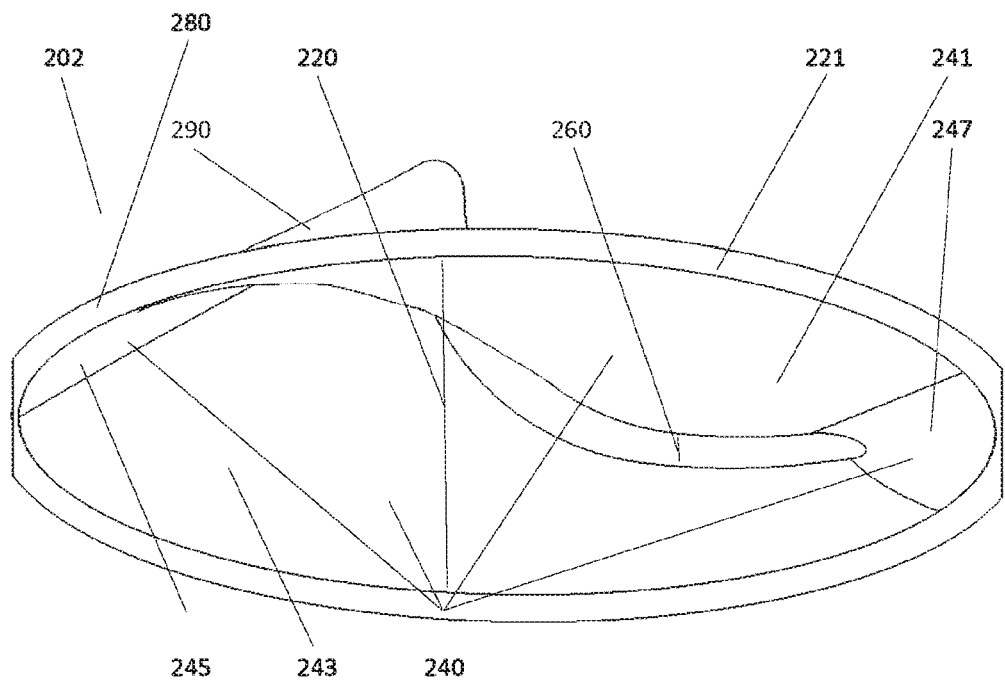
FIG. 5 is a back plan view of the example apparatus illustrating a view of the inlet.
Figure 6:
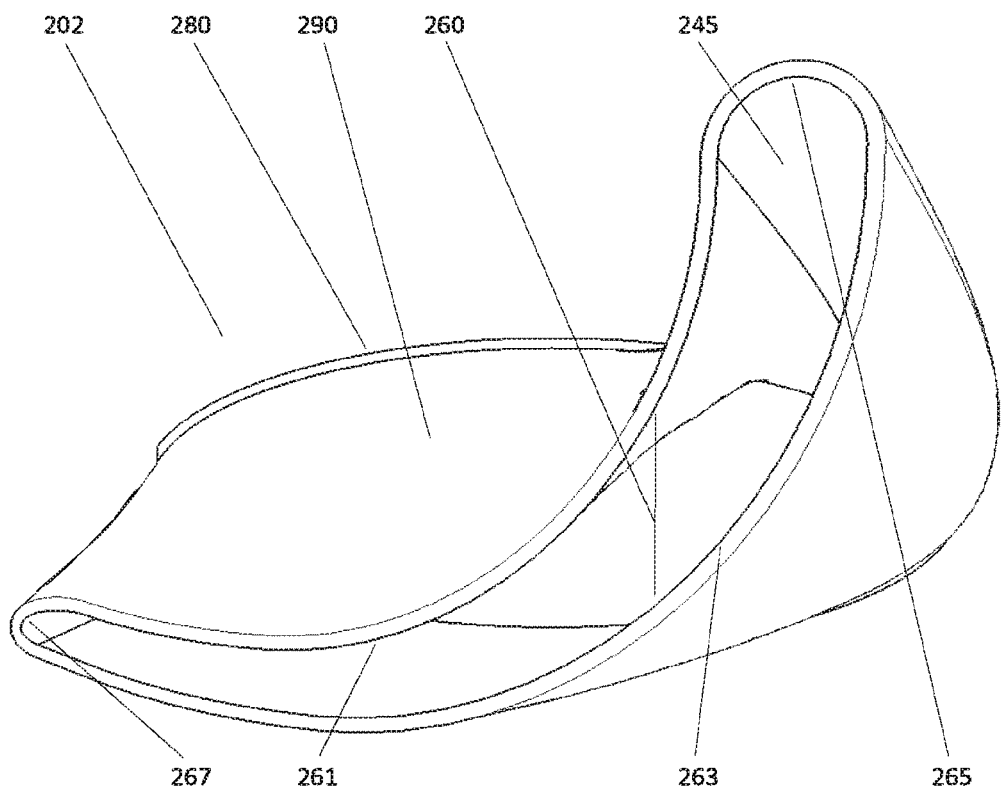
FIG. 6 is a front plan view of the example apparatus illustrating a view of the outlet.
Figure 7:
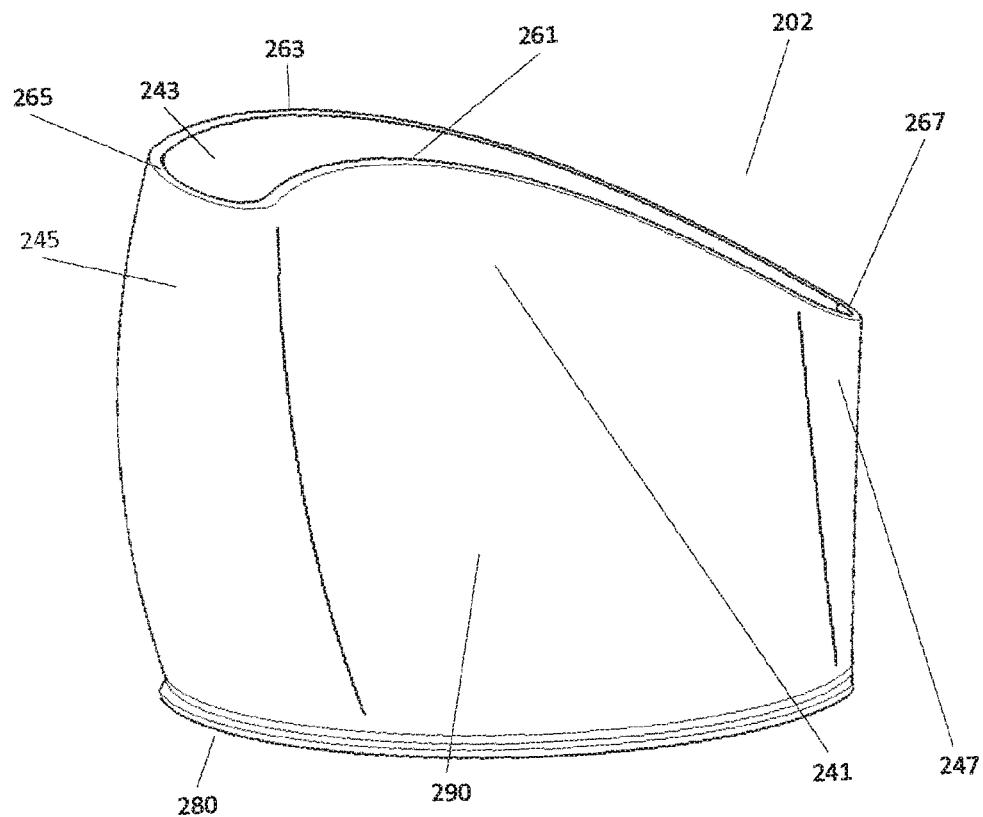
FIG. 7 is a top plan view of the example apparatus.

113 Crest
    114 Back
    115 Lip
    117 Plunging lip
    119 Break Zone
130 Inner Barrel Flow Path
    131 Barrel
    133 Trough Boundary Layer
    135 Trough
    137 Face
    117 Hydraulic Jump
150 Primary Flow
202 Shaping Head (Apparatus)
    220 Inlet
        221 Inlet Edge
    240 Passage
        241 Face and Trough Shaping Contour
        243 Back Wall Shaping Contour
        245 Shoulder Shaping Contour
        247 Trough Boundary Shaping Contour
    260 Outlet
        261 Face and Trough Shaping Edge
        263 Back Wall Shaping Edge
        265 Shoulder Shaping Edge
        267 Trough Boundary Shaping Edge
    280 Apparatus Flange
    290 Outer Shell
303 Stationary Wave Embodiment
    310 Pedestal
    320 Pump
        321 Intake Chamber
        323 Intake Casing
        325 Intake Chamber
    330 Height Adjustment Mechanism
        331 Pillars - Height Adjustment
        333 Support Casings - Height Adjustment
        325 Sleeve
    340 Ball Joint
        341 Ball Joint Socket
        343 Ball Joint Ball
        345 Ball Joint Adjuster Arm
    350 Chamber
        351 Chamber Flange
        353 Chamber Edge
    370 Matrix Capillaries
        371 Capillaries
        373 Capillary Diameter
        375 Curved Pipe Chamber
        377 Curved Pipe Diameter
404 Body of Water
    410 Surface Wave Form As illustrated in FIGS. 1 through 3, a primary flow 150 of water is altered as it is urged through the active edges and surfaces of the inlet 220, contoured passage 240, and outlet 260 of an example embodiment of the apparatus 202. The alteration of flow results in the generation of a wave form 101.

As illustrated in FIGS. 1 through 3, the simulated wave generated by the example embodiment of the apparatus 202 is described as a right breaking plunging wave comprising an outer barrel flow path 110 and an inner barrel flow path 130. The outer barrel flow path 110 which plunges over wave form 101, and into the break zone 119, is described as comprising a shoulder 111, crest 113, back 114, lip 115, and plunging lip 117. The inner barrel flow path 130, which flows from the trough 135, up the face 137, to barrel 131 over wave form 101, and into the break zone 119, is described as comprising a trough layer boundary 133, trough 135, face 137, and barrel 131.

As illustrated in FIGS. 1 and 2, the primary flow 150 is altered as it is urged through the apparatus 202, so that the flow of the wave form 101 resembles a horizontal ring vortex or spiral fluid pathway.

Accordingly, a portion of the primary flow path 150, is directed into or partially into the primary flow path 150, and is altered to become the inner barrel flow path 130, spiraling from the outer trough layer boundary 133, up the face 137, to barrel 131 over the wave form 101, finally plunging into the break zone 119, completing almost one full spiral rotation, as the flow moves away from the apparatus 202.

Another portion of the primary flow path 150, of which is directed into or partially into the primary flow path 150, and of which is also directed into the inner barrel flow path 130, is altered to become the outer barrel flow path 110, spiraling from the trough layer boundary 133, up the back 114 of the form 101, over the shoulder 111 and crest 113, to barrel 131 over the wave form 101, finally plunging into the break zone 119, completing almost one full spiral rotation, as the flow moves away from the apparatus 202.

Figure 9:
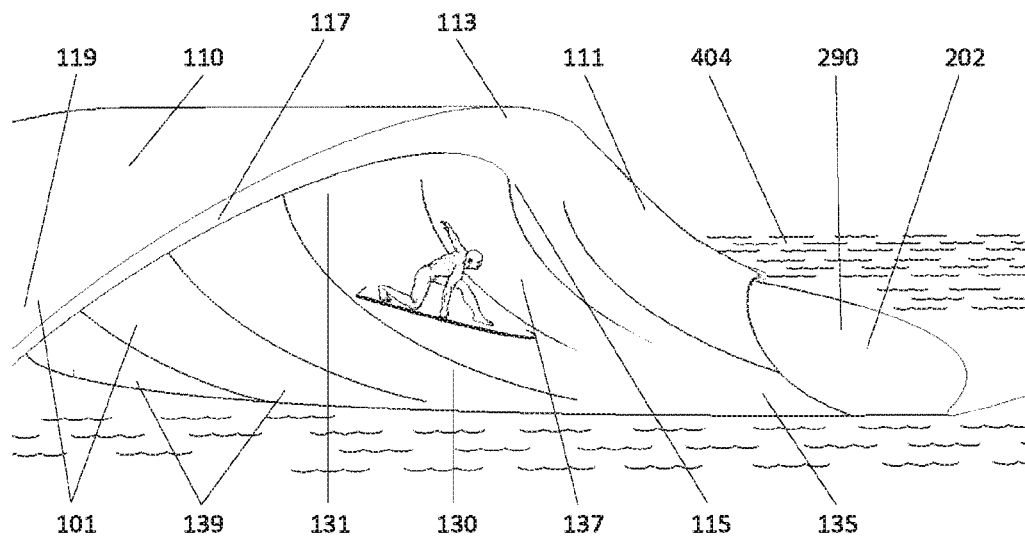
FIG. 9 is an elevated side view illustrating the altered flow out of a second example apparatus.
Figure 10:
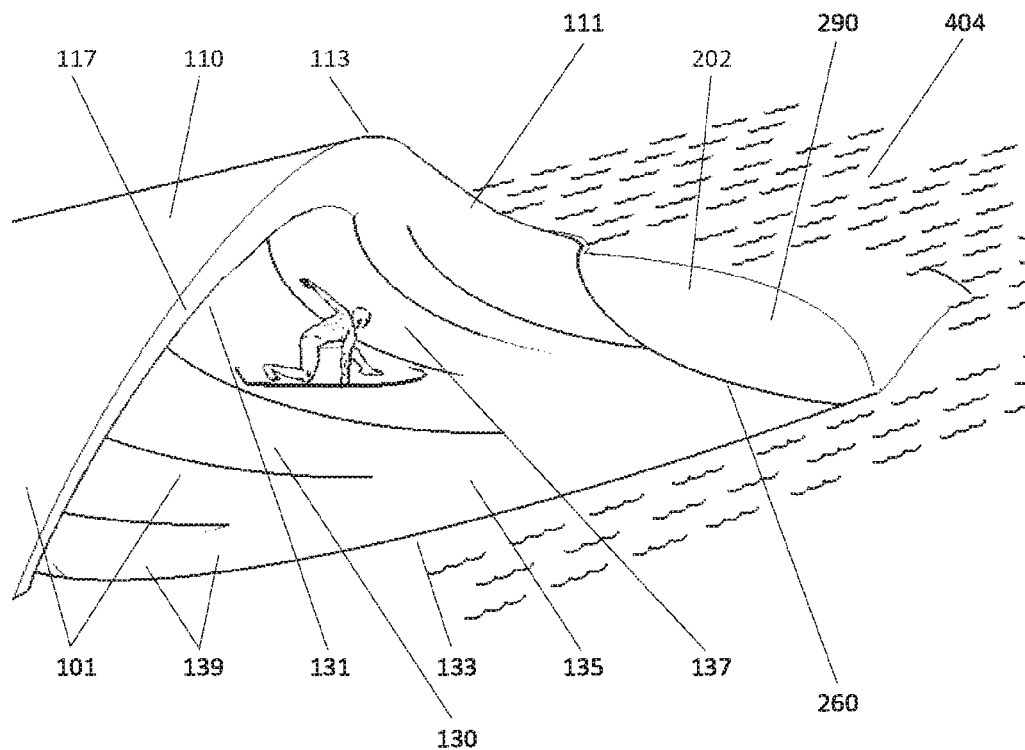
FIG. 10 is a perspective view illustrating the altered flow out of the second example apparatus.
Figure 11:
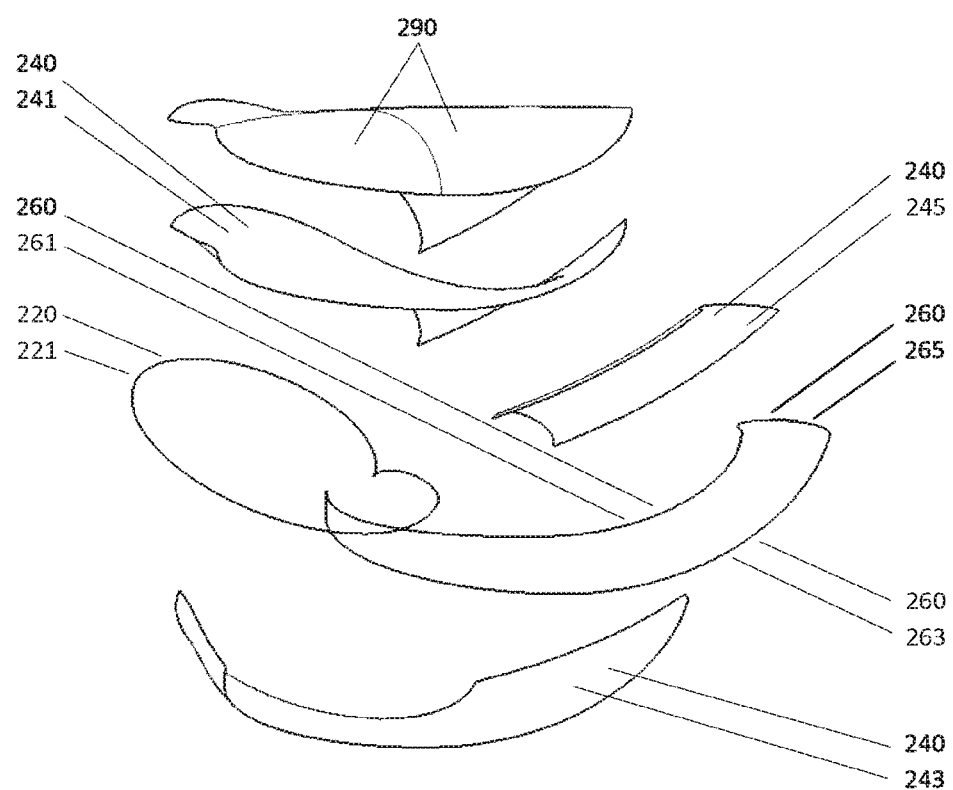
FIG. 11 is an exploded perspective view illustrating the active edges and surfaces of the second example apparatus.
Figure 12:
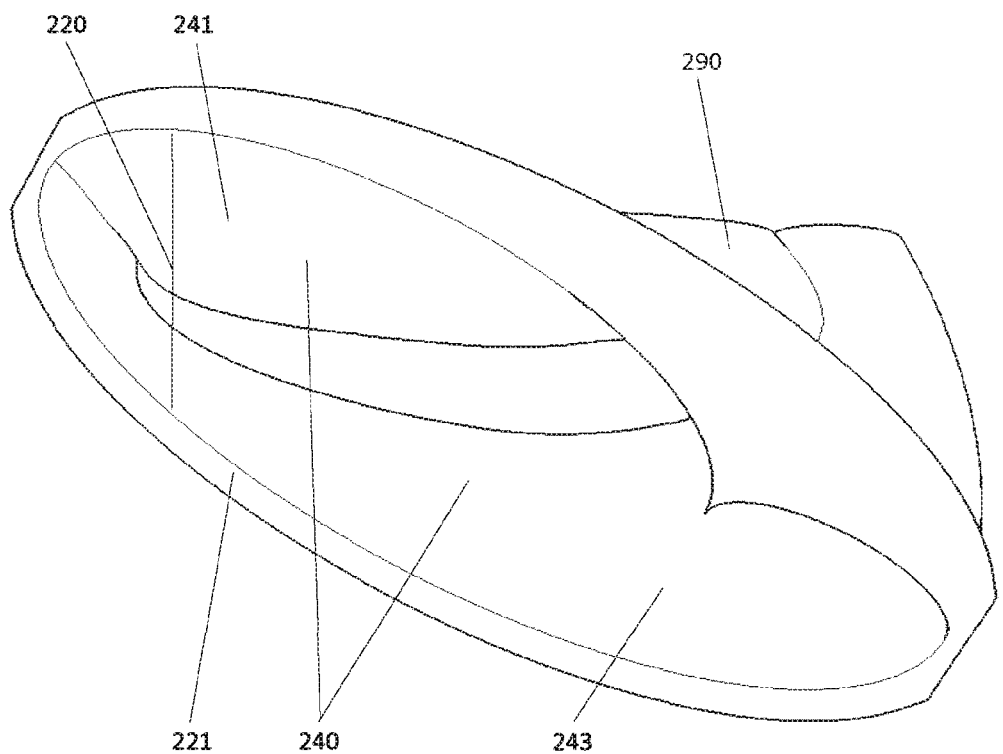
FIG. 12 is a back plan view of the second example apparatus illustrating a view of the inlet.
Figure 13:
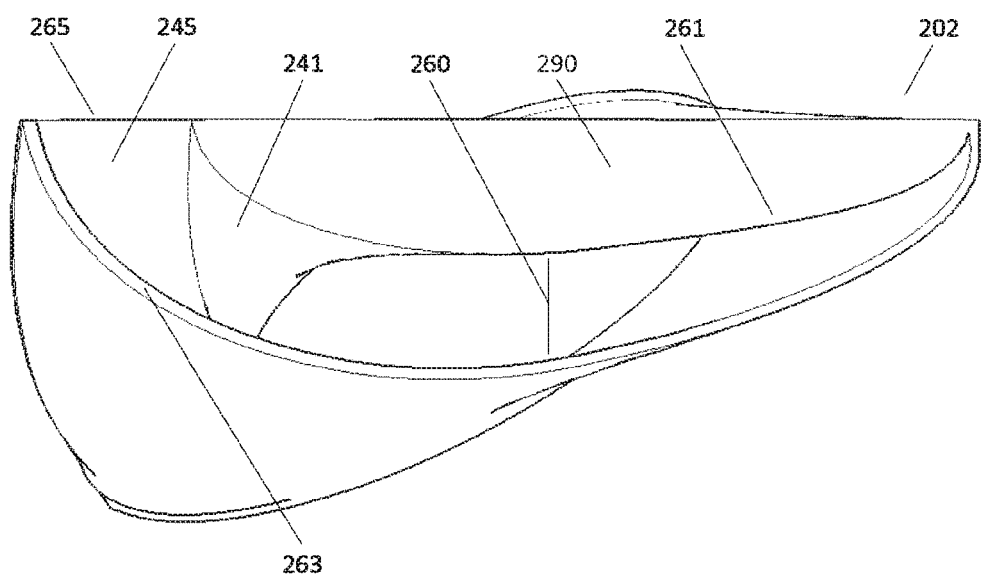
FIG. 13 is a front plan view of the second example apparatus illustrating a view of the outlet.

As illustrated in FIGS. 9 and 10, the simulated wave of the second example apparatus 202 is described as a left breaking plunging wave comprising an outer barrel flow path 110 and an inner barrel flow path 130. The outer barrel flow path 110, which plunges over wave form 101 and into the break zone 119, is described as comprising a shoulder 111, crest 113, back 114, lip 115, and plunging lip 117. The inner barrel flow path 130, which flows from the trough 135, up the face 137, to barrel 131 over wave form 101, and into the break zone 119, is described as comprising a trough boundary layer 133, trough 135, face 137, and barrel 131.

As illustrated in FIGS. 9 and 10, the apparatus 202 is fully submerged in the water body 404 and the trough 135 surface is below the surface 410 of the water body 404; creating a surf-able hydraulic jump 139 in the water body 404. The submersion of the outlet 260, or portion of, below the surface 410 of the water body 404 causes a displacement of water in the water body 404, resulting in a variety of surf-able wave forms, for example, such as a hydraulic jump 139 or wake.

In the example embodiment 202, it can be observed that the outer shell 290 is configured to obstruct the unwanted flow from of water body 404 from behind the outlet 260.

As illustrated in FIGS. 9 and 10 and described previously, without a clear frame of reference, it can be impossible for an observer to distinguish whether the apparatus 202 is stationary in the body of water 404, or whether the apparatus 202 is being urged through the body of water 404, for example by a means for urging the apparatus, for example a jet or a motorized propeller. FIGS. 9 and 10 illustrate the generation of the wave form 101 both by urging the apparatus 202 through a body of water 404 and by urging a flow through the apparatus 202 while the apparatus 202 is stationary in the body of water 404.

Apparatus

As illustrated in FIGS. 4 through 8, the example apparatus is comprised of an inlet 220, a contoured internal passage 240 that connects the inlet 220 to the outlet 260, an outlet 260, and an outer shell 290 that encases the inlet 220, passage 240, and outlet 260. The inlet 220 comprises an inlet edge 221. The passage comprises a face and trough shaping contour 241, a back wall shaping contour 243, a shoulder shaping contour 245, and a trough boundary shaping contour 247. The outlet 260 comprises a face and trough shaping edge 261, a back wall shaping edge 263, a shoulder shaping edge 265, and a trough boundary edge 267. As illustrated, the inlet, passage, and outlet of the example apparatus are bounded on all sides.

As illustrated in FIGS. 11 through 15, the second example apparatus is comprised of an inlet 220, a contoured internal passage 240 that connects the inlet 220 to the outlet 260, an outlet 260, and an outer shell 290 that encases the inlet 220, passage 240, and outlet 260. The inlet 220 comprises an inlet edge 221. The passage comprises a face and trough shaping contour 241, a back wall shaping contour 243, and a shoulder shaping contour 245; but instead of having a trough boundary shaping contour 247, the back wall shaping contour connects directly to the face and trough shaping contour. The outlet 260 comprises a face and trough shaping edge 261, a back wall shaping edge 263, and a shoulder shaping edge 265; but instead of having a trough boundary edge 267, the back wall shaping edge 263 connects directly to the face and trough shaping edge 261. As illustrated, the inlet, passage, and outlet of the example apparatus are bounded on all sides.

Inlet—Inlet Edge

As illustrated in FIGS. 4 through 8, in the first example embodiment 202, the edge 221 shape of the inlet 220 roughly matches the edge 353 the oval shape of a chamber 350, allowing the flow to transition from the chamber 350 into the passage 240 of the apparatus 202 without encountering any abrupt changes that could negatively alter the flow path, adding turbulence to the flow in the process.

As illustrated in FIGS. 11 through 15, in the second example embodiment 202, the shape of the inlet edge 221 is dictated by the shape and form of the three active surfaces of the passage 240 so that the inlet edge 221 comprises a curved edge bounding the inlet 220 side of the face and trough shaping contour 241; a curved edge bounding the inlet 220 side of the back wall shaping contour 243, of which also takes the form of an oval chamber 350 outlet edge 353 shape; and a curved edge bounding the inlet 220 side of the shoulder shaping contour 245.

Passage

As illustrated in FIGS. 1-15, the active surfaces that comprise the passage 240 function to alter the primary flow 150 of water as it passes through the passage 240. Combinations of these active surfaces enable the passage 240 to alter the primary flow 150 into becoming the flows that form the example wave forms 101. The configuration of these active surfaces can be altered in a variety of ways to create a variety of desired wave forms 101.

As illustrated in FIGS. 4 through 8, in the first example embodiment of the apparatus 202, the passage 240 connects the inlet 220 to the outlet 260 and is segmented into approximately four active surfaces: a face and trough shaping contour 241, a back wall shaping contour 243, a shoulder shaping contour 245, and a trough boundary shaping contour 247. The example apparatus 202 grows at a logarithmic rate, from an oval shape at the inlet 220 to an approximately circular shape at the outlet 260; and follows the curved path of a circle having a diameter approximately two times the diameter of the passage 240 diameter; from 0 degrees relative to the primary flow at inlet 220, to approximately 30 degrees relative to primary flow at outlet 260.

Figure 8:
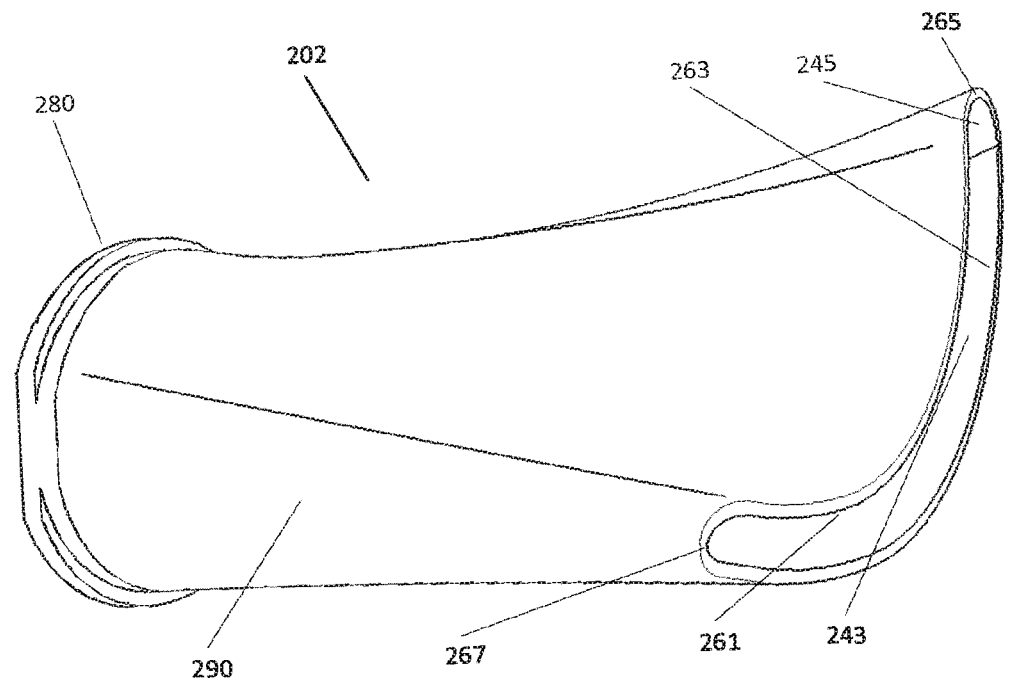
FIG. 8 is a side plan view of the example apparatus.

As illustrated in FIG. 8, in the example embodiment, the face and trough shaping contour 241 is inset relative to the back wall shaping contour 243 and shoulder shaping contour 245, to inhibit the inner barrel flow path 130 from overtaking the outer barrel flow path 110. In some exemplary embodiments, the inset is reduced to create non-barreling waves.

As illustrated in FIGS. 11 through 15, in the second example embodiment of the apparatus 202, the passage 240 connects the inlet 220 to the outlet 260 and is segmented into approximately three active surfaces: a face and trough shaping contour 241, a back wall shaping contour 243, and a shoulder shaping contour 245. The example apparatus 202 grows at a logarithmic rate, from an oval shape at the inlet 220 to an approximately circular shape at the outlet 260; follows the curved path of a circle having a diameter approximately two times the diameter of the passage 240 diameter; from 0 degrees relative to the primary flow at inlet 220, to approximately 30 degrees relative to primary flow at outlet 260; and spirals from negative 30 degrees at inlet 220 to 0 degrees at outlet 260.

Figure 14:
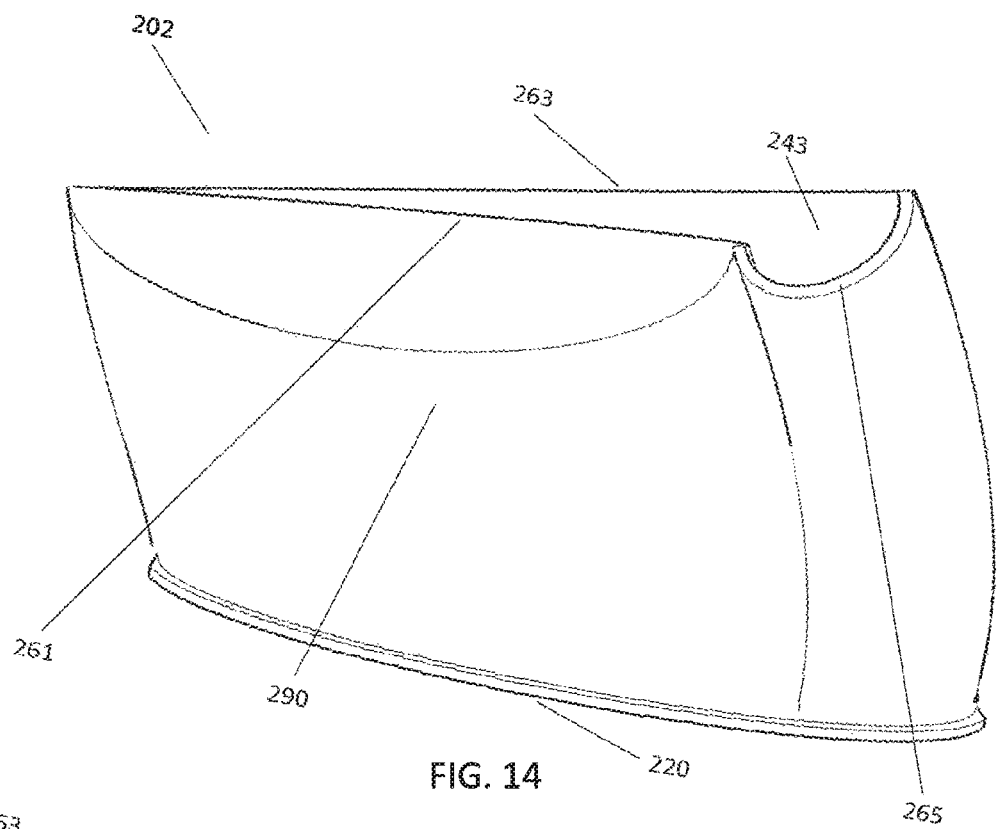
FIG. 14 is a top plan view of the second example apparatus.

As illustrated in FIG. 14, in the example embodiment, the face and trough shaping contour 241 is inset relative to the back wall shaping contour 243 and shoulder shaping contour 245, to inhibit the inner barrel flow path 130 from overtaking the outer barrel flow path 110. In some exemplary embodiments, the inset is reduced to create non-barreling waves.

In some exemplary embodiments of the apparatus 202, the active surfaces that make up the passage 240, or parts thereof, are designed in accordance with geometries found in nature, for example the geometries of the interior and or exterior edges of shells such as that of the phylum Mollusca; Gastropoda, Bivalvia, or Cephalopoda. In some exemplary embodiments, the active surfaces that make up the passage 240, or parts thereof, are designed in accordance with the geometry of the golden section. In some exemplary embodiments, the active surfaces that make up the passage 240, or parts thereof, extend out from the direction of the inlet in a logarithmic rate.

In an alternate embodiment, the passage 240 is partitioned into two or more ports, so that multiple flows can be angled towards each other, creating an intersection of flows at a point within the passage 240 or at the outlet 260. The benefit to partitioning the passage 240 into multiple ports is that the water flow in each port can be controlled by a valve. The ability to control the flow in each port enables the wave characteristics to be altered during operation, by simply adjusting the flows of each port. The disadvantage to partitioning the passage 240 though, is that a certain amount of turbulence can be created by the intersecting flows; most notably when the flow of one port is substantially different than the flow of another. Another disadvantage to the utilization of multiple ports within the passage 240 is the added complexity of the design caused by the partitions and valves. An advantage of utilizing multiple ports is the added ability to intersect flows of water at greater angles.

Passage—Face and Trough Shaping Contour

As illustrated in FIGS. 1 through 3, as the primary flow 150 is urged through the passage 240, the face and trough shaping contour 241, obstructs the primary flow path 150, forcing a portion of the primary flow path 150 to spiral from the outer trough boundary 133, up the face 137, and barrel 131 over the wave form 101, finally plunging into the break zone 119, completing almost one full spiral rotation, as the flow moves away from the apparatus 202, forming the inner barrel flow path 130.

As illustrated in FIGS. 4 through 8, in first example embodiment, the face and trough shaping contour 241 is a convex obstruction relative to the primary flow path 150, which takes the approximate form of a portion of a sea muscle shell. This contoured surface 241 is bounded by a segment of the inlet edge 221 and is bounded by the face and trough shaping edge 261 segment of the outlet 260. The face and trough shaping contour 241 is bounded on its sides by the shoulder shaping contour 245 and the trough boundary shaping contour 247.

As illustrated in FIGS. 11 through 15, in second example embodiment, the face and trough shaping contour 241 is a convex obstruction relative to the primary flow path 150, which takes the approximate form of a portion of a sea muscle shell. This contoured surface 241 is bounded by a segment of the inlet edge 221 of the inlet 220 and is bounded by the face and trough shaping edge 261 segment of the outlet 260. In the example embodiment, the face and trough shaping contour 241 is bounded on its sides by the shoulder shaping contour 245 and the back wall shaping contour 243.

Passage—Back Wall Shaping Contour

As illustrated in FIGS. 1 through 3, as the primary flow 150 is urged through the passage 240, the concave back wall shaping contour 243, obstructs a portion of the primary flow path 150, causing the flow to spiral up and over the back of the outer barrel flow path 110, and barrel 131 over the wave form 101, finally plunging into the break zone 119, while directing the flow in toward the inner barrel flow path 130.

As illustrated in FIGS. 4 through 8, in the first example embodiment, the back wall shaping contour 243 bounded on its sides by the trough boundary shaping contour 247 and the shoulder shaping contour 245; and is bounded by the back wall shaping edge 263 of the outlet 260 and a portion of the inlet edge 221 of the inlet 220.

As illustrated in FIGS. 11 through 15, in the second example embodiment, the back wall shaping contour 243 bounded on its sides by the face and trough shaping contour 247 and the shoulder shaping contour 245; and is bounded by the back wall shaping edge 263 of the outlet 260 and a portion of the inlet edge 221 of the inlet 220.

It has been found, in alternate embodiments, that the back wall shaping contour 243 can be designed to generate a flow that intersects with the flow path of the face and trough shaping contour 241, that does not spiral but merely cups the spiral inner barrel flow 130 of the face and trough shaping contour 241. It is perceived, though, that generating two complimentary spiralling flow paths generates less resistance and so is more efficient.

Passage—Trough Boundary Shaping Contour

As illustrated in FIGS. 1 through 3, as the primary flow 150 is urged through the passage 240, trough boundary shaping contour 247 is configured to urge a portion of the primary flow path 150, away from the direction of the primary flow path 150 so that less turbulence is created in the interaction between the trough boundary flow and the water body 404. In alternate embodiments, the trough boundary shaping contour 247 is configured to urge a portion of the primary flow 150 into the primary flow path 150.

As illustrated in FIGS. 4 through 8, in the example embodiment, the trough boundary shaping contour 247, bounded on its sides by the face and trough shaping contour 247 and the back wall shaping contour 243; and is bounded by the trough boundary edge 267 of the outlet 260 and a portion of the inlet edge 221 of the inlet 220.

Passage—Shoulder Shaping Contour

As illustrated in FIGS. 1 through 3, as the primary flow 150 is urged through the passage 240, the concave shoulder shaping contour 245 urges a portion of the primary flow path 150, upward and into the primary flow path 150. The force of this flow is necessary for creating the barrel 131 of the wave form 101. As can be observed in FIG. 3, the angle at which the angle shoulder shaping contour 245 intersects the primary flow path 150 dictates, at least in part, the angle at which the outer barrel flow path 110 barrels 131 over the wave form 101.

As illustrated in FIGS. 4 through 8 and 11 through 15, in both example embodiments, the shoulder shaping contour 245 is bounded on its sides by the back wall shaping contour 243 and the face and trough shaping 241; and is bounded by the shoulder shaping edge 267 of the outlet 260 and a portion of the inlet edge 221 of the inlet 220. In the example embodiments, the shoulder shaping contour 245 is angled upwards at approximately 45 degrees, and is angled in toward the primary direction of flow at an approximate angle of 30 degrees.

Outlet

The outlet 260 edge shapes can be modified in any way necessary to achieve a desired shape of flow for the wave form 101, for example as illustrated in FIGS. 1 through 3.

As illustrated in FIGS. 4 through 8, in the first example embodiment, the outlet 260 edge is segmented into approximately four active edge sections: a trough boundary edge 267, a face and trough shaping edge 261, a back wall shaping edge 263, and a shoulder shaping edge 265.

As illustrated in FIGS. 11 through 15, in the second example embodiment, the outlet 260 edge is segmented into approximately three active edge sections: a face and trough shaping edge 261, a back wall shaping edge 263, and a shoulder shaping edge 265.

In some exemplary embodiments, the edge shape, or parts thereof, that make up the outlet 260 are designed in accordance with geometries found in nature, for example the geometries of the interior and or exterior edges of shells such as that of the phylum Mollusca; Gastropoda, Bivalvia, or Cephalopoda. In some exemplary embodiments, the edge shape, or parts thereof, are designed in accordance with the geometry of the golden section. In some exemplary embodiments, the edge shape, or parts thereof, extend out from the direction of the inlet in a logarithmic rate, such as described in the example embodiment.

Outlet—Trough Boundary Edge

As illustrated in FIGS. 1 through 3, the trough boundary edge 267 determines the shape of the trough boundary flow layer 133 portion of the wave form 101.

As illustrated in FIGS. 4 through 8, the trough boundary edge 267 is round and connects the face and shaping edge 261 to the back wall shaping edge 263. As well, the trough boundary edge 267 serves as the bounding edge of the trough boundary shaping contour 247 at the outlet 260.

Outlet—Face and Trough Shaping Edge

As illustrated in FIGS. 1 through 3, 9, and 10, the face and trough shaping edge 261 creates the shape of the face 137 and trough 135 portions of the inner barrel flow path 130, of the wave form 101.

As illustrated in FIGS. 4 through 8, in the example embodiment, the face and trough shaping edge 261 is ovalesque in shape. The face and trough shaping edge 261 connects the trough boundary edge 267 segment of the outlet 260 to the shoulder shaping edge 265 segment of the outlet 260 and serves as the bounding edge of the face and trough shaping contour 241 at the outlet 260.

As illustrated in FIGS. 11 through 15, in the example embodiment, the face and trough shaping edge 261 is ovalesque in shape. The face and trough shaping edge 261 connects the back wall shaping edge 263 segment of the outlet 260 to the shoulder shaping edge 265 segment of the outlet 260 and serves as the bounding edge of the face and trough shaping contour 241 at the outlet 260.

As illustrated in FIG. 8, in the example embodiment, the face and trough shaping edge 241 is inset relative to the back wall shaping edge 263 and shoulder shaping edge 265 so that the inner barrel flow path 130, of FIGS. 1 through 3, is prevented from overtaking the outer barrel flow path 110, of FIGS. 1 through 3, enabling the wave form 101 to barrel 131.

It is exemplary in some embodiments that the face and trough shaping edge 261, or portions of, and face and trough shaping contour 241, or parts thereof, are not inset relative to the back wall shaping edge 263 and shoulder shaping edge 265, to allow the inner barrel flow 130 to overtake the outer barrel flow 110 and roll over the back of the wave form 101, creating a non-barreling wave form 101.

Outlet—Shoulder Shaping Edge

As illustrated in FIGS. 1 through 3, the shoulder shaping edge 265 controls the shape of the crest 113 and shoulder 111 portions of the outer barrel flow path 110 of the wave form 101.

As illustrated in FIGS. 4 through 8 and 11 through 15, in both example embodiments, the shoulder shaping edge 265 connects the back wall shaping edge 263 to the face and trough shaping edge 261 and serves as the bounding edge of the shoulder shaping contour 245 at the outlet 260.

Outlet—Back Wall Shaping Edge

As illustrated in FIGS. 1 through 3, the back wall shaping edge 263 creates the shape of the back wall 114 portion of the flow that makes up the outer barrel flow path 110 of the wave form 101.

As illustrated in FIGS. 4 through 8, in the first example embodiment, the back wall shaping edge 263 connects the trough boundary edge 267 segment of the outlet 260 to the shoulder shaping edge 265 segment of the outlet 260 and serves as the bounding edge of the outlet edge of the back wall shaping contour 243.

As illustrated in FIGS. 11 through 15, in the second example embodiment, the back wall shaping edge 263 connects the face and trough shaping edge 261 segment of the outlet 260 to the shoulder shaping edge 265 segment of the outlet 260 and serves as the bounding edge of the outlet edge of the back wall shaping contour 243.

Figure 15:
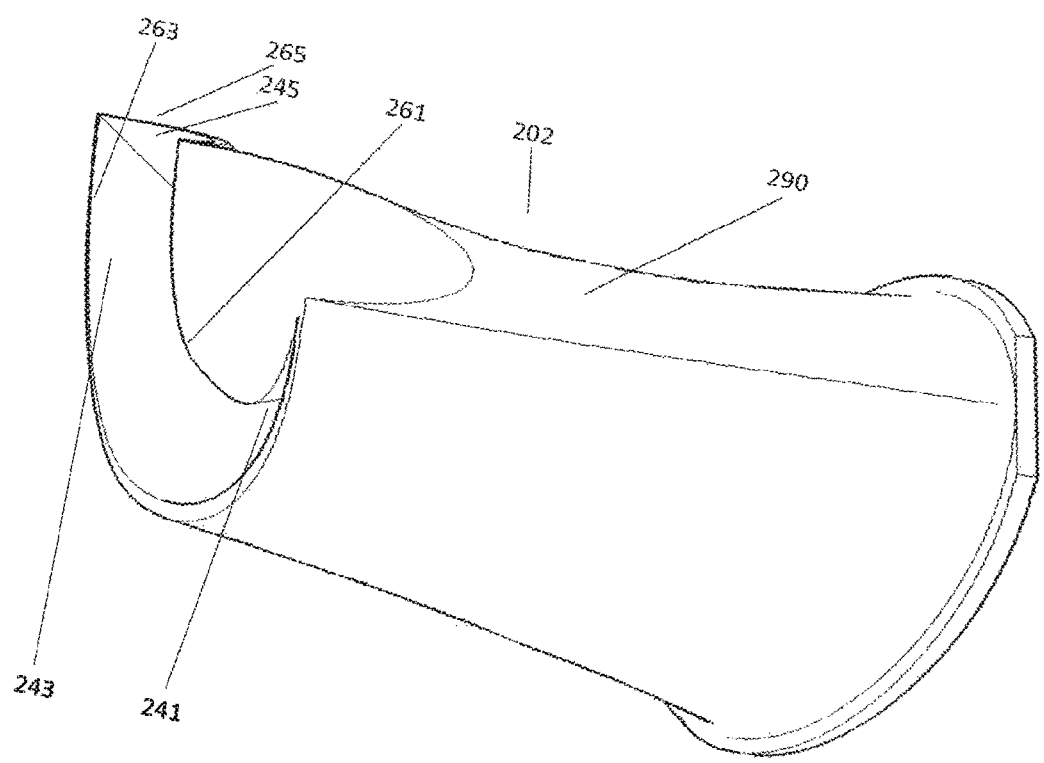
FIG. 15 is a side plan view of the second example apparatus.

As illustrated in FIGS. 8 and 15, in both example embodiments, the back wall shaping edge 263 extends out further from the inlet 220 than the face and trough shaping edge 261, for reasons explained previously.

Flange

As illustrated in FIGS. 5 through 8, in this example embodiment, the apparatus 202 is also fitted with a flange 280 for mating with the chamber 350 of the apparatus 202, as will be further described later.

Outer Shell

As illustrated in FIGS. 5 through 8 and 12 through 15, the surfaces of the outer shell 290 encase the internal parts of the apparatus 202.

As illustrated in FIGS. 5 through 8, in this example embodiment, the outer shell 290 simply takes the approximate form of the active surfaces that make up the inlet 220, passage 240, and outlet 260. It is an exemplary feature of the apparatus 202 that the outer shell 290 can be designed to suite any desired aesthetic provided the design does not interfere with the function or active edges and surfaces of the apparatus 202.

As illustrated in FIGS. 12 through 15, in this example embodiment the outer shell 290 takes the approximate form of the active surfaces that make up the inlet 220, passage 240, and outlet 260; and is also configured to obstruct the unwanted flow from of water body 404 from behind the outlet 260.

Figure 16:
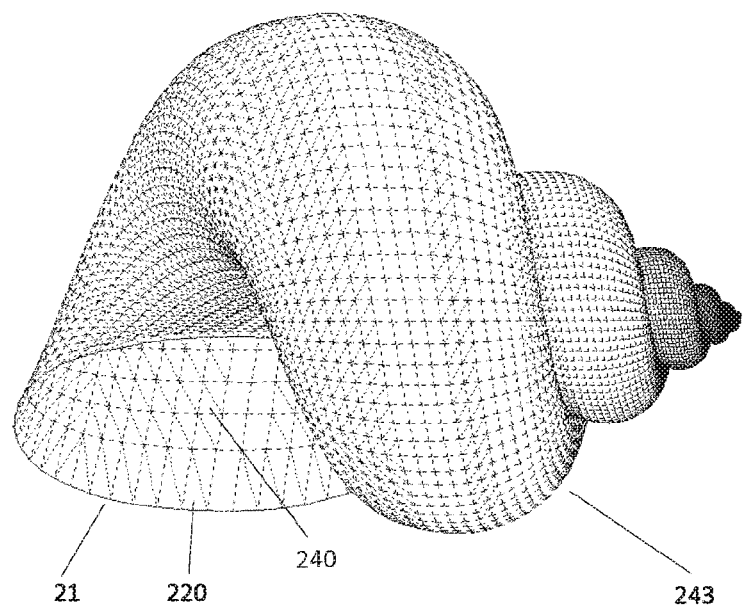
FIG. 16 is an illustration of an example shell from the phylum Mollusca.
Figure 17:
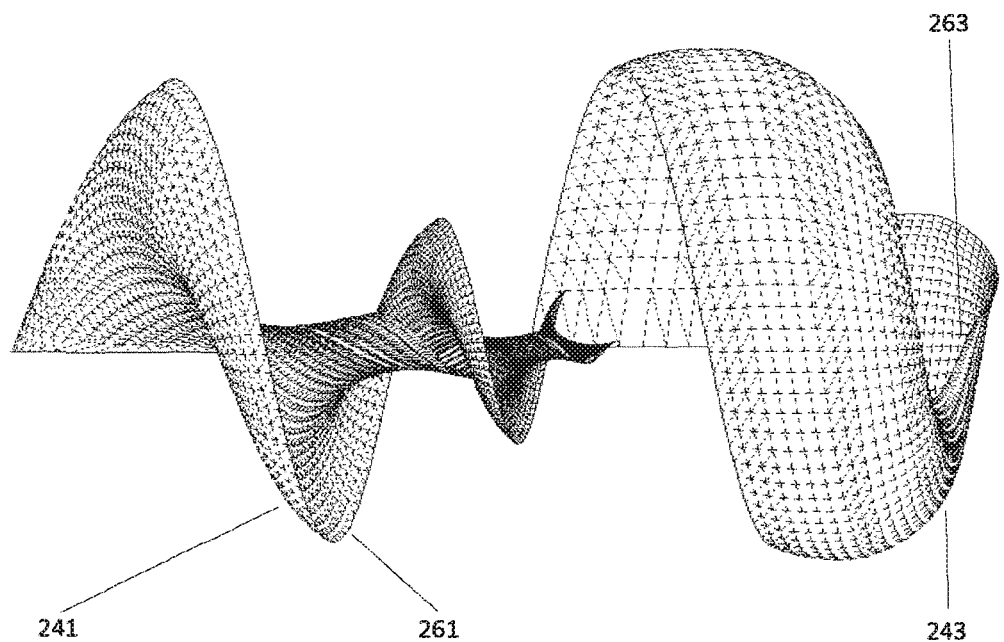
FIG. 17 is an illustration of example geometries resembling the interior edges and surfaces of the shell from the phylum Mollusca.

As illustrated in FIGS. 16 and 17, in some exemplary embodiments, the active edges and surfaces that make up the inlet 220, passage 240, and outlet 260, or parts thereof, are designed in accordance with geometries found in nature, for example the geometries of the interior and or exterior edges and surfaces of shells such as that of the phylum Mollusca; Gastropoda, Bivalvia or Cephalopoda.

Accordingly, in some exemplary embodiments, the active edges and surfaces that make up the inlet, passage, and outlet, or parts thereof, are designed in accordance with the geometry of the golden section.

Stationary Wave Embodiment

Figure 18:
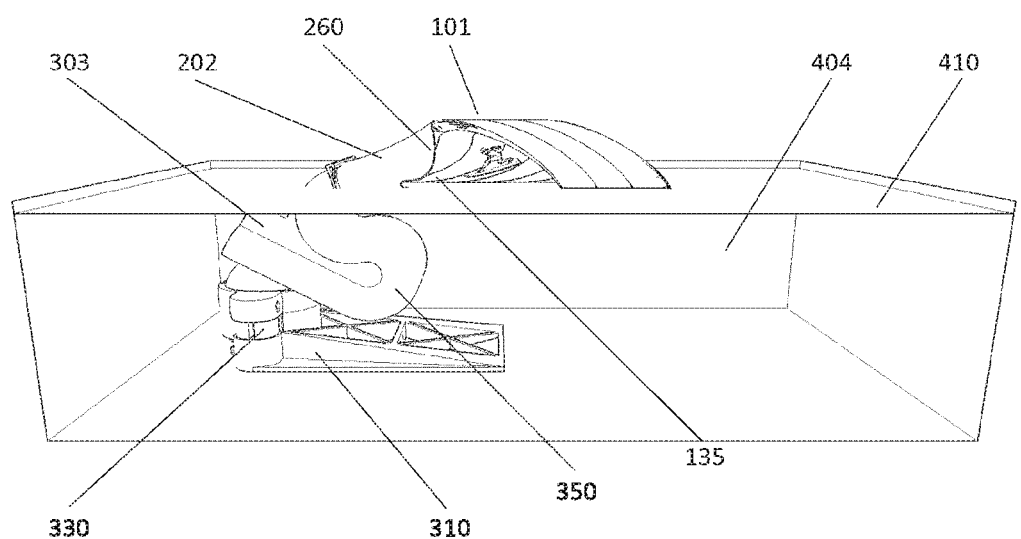
FIG. 18 is an elevated side view of the apparatus in a body of water according to an example embodiment.
Figure 19:
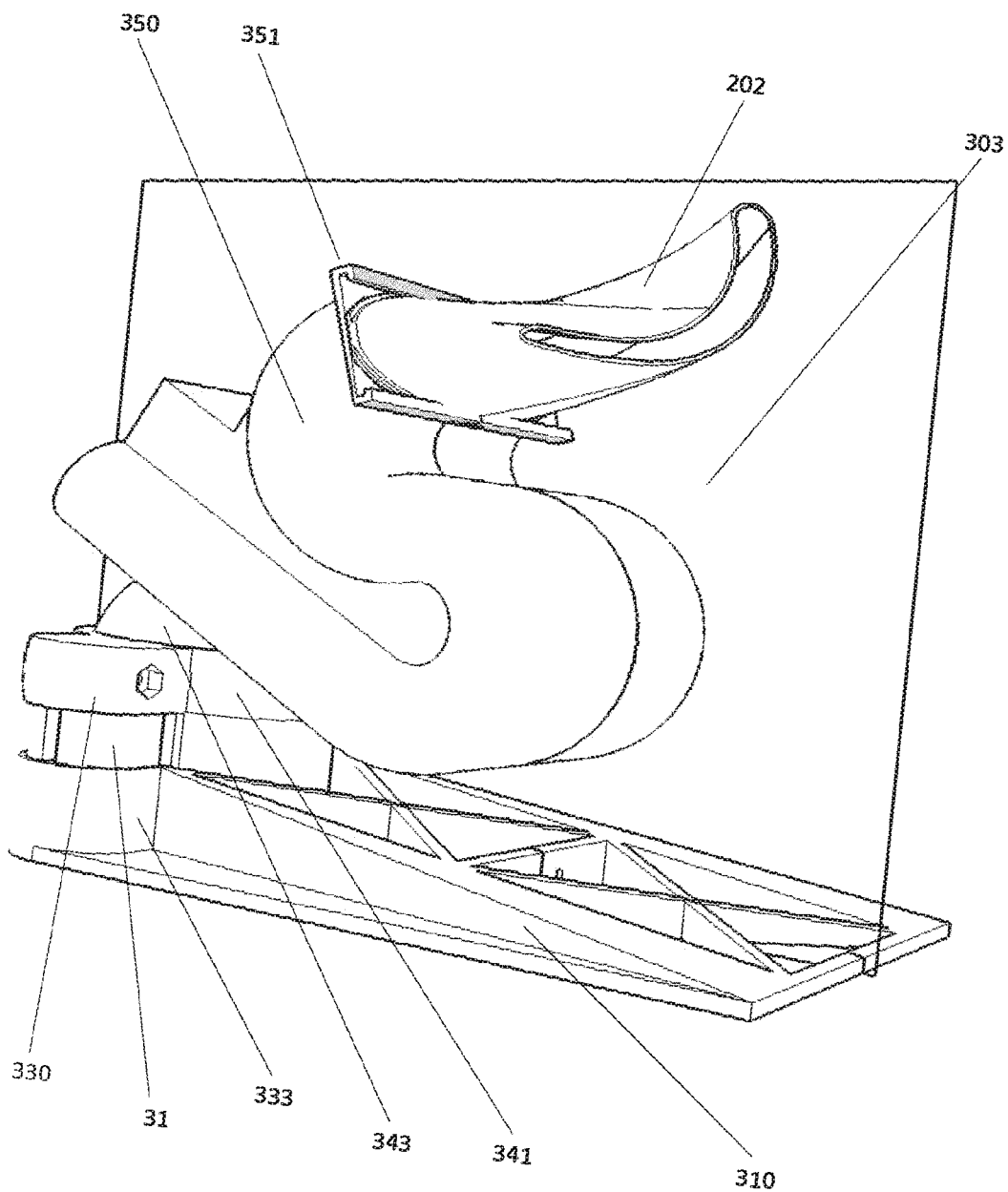
FIG. 19 is a perspective view of the apparatus according to the example embodiment.

As illustrated in FIG. 18, in this example embodiment, the apparatus 202 resides in a body of water 404. The outlet 260 of the apparatus 202 is semi-submerged in the body of water 404, so that the wave form's trough 135, is roughly level with the surface 410 of the water body 404 so that no hydraulic jump 139 is produced in the water body 404.

Figure 20:
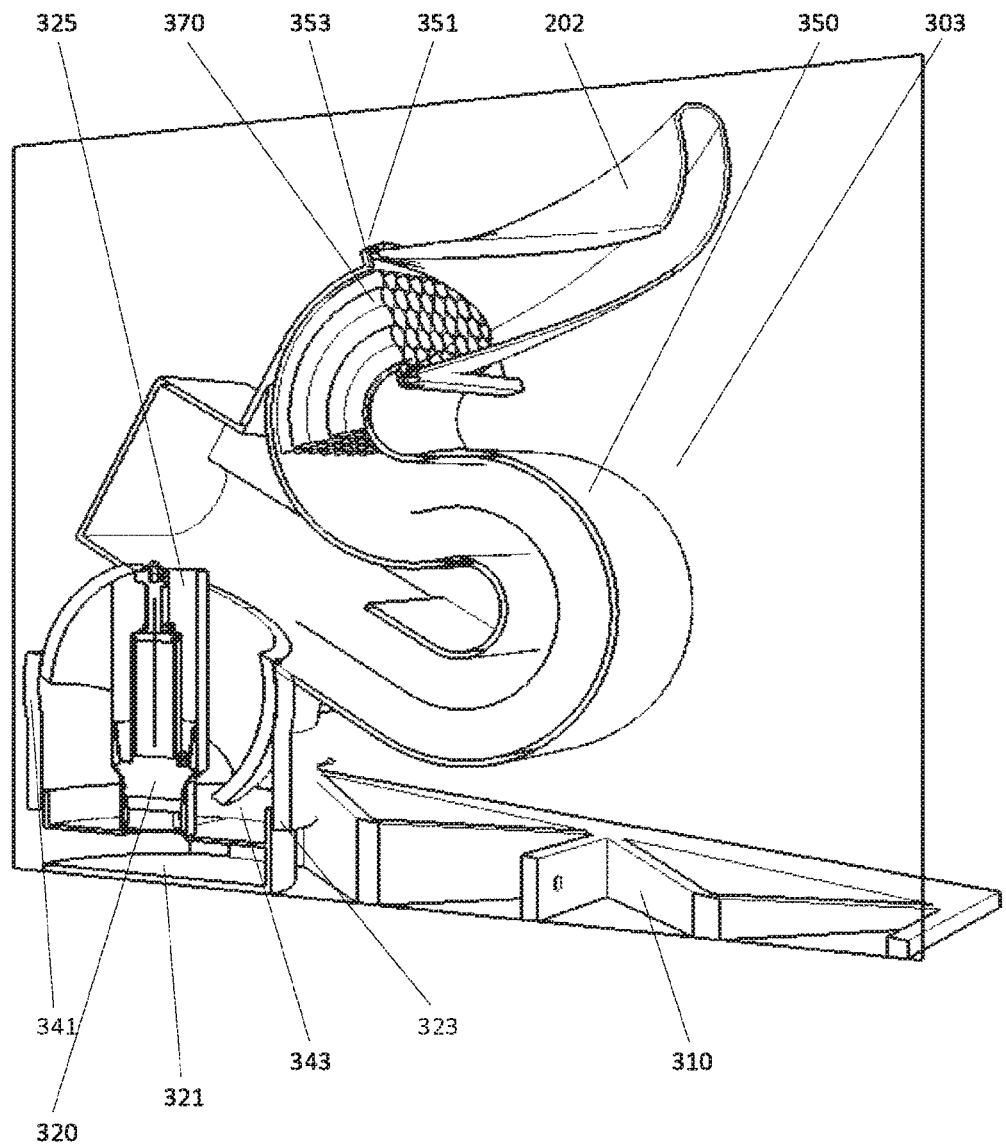
FIG. 20 is a sectional perspective view of the apparatus according to the example embodiment.
Figure 21:
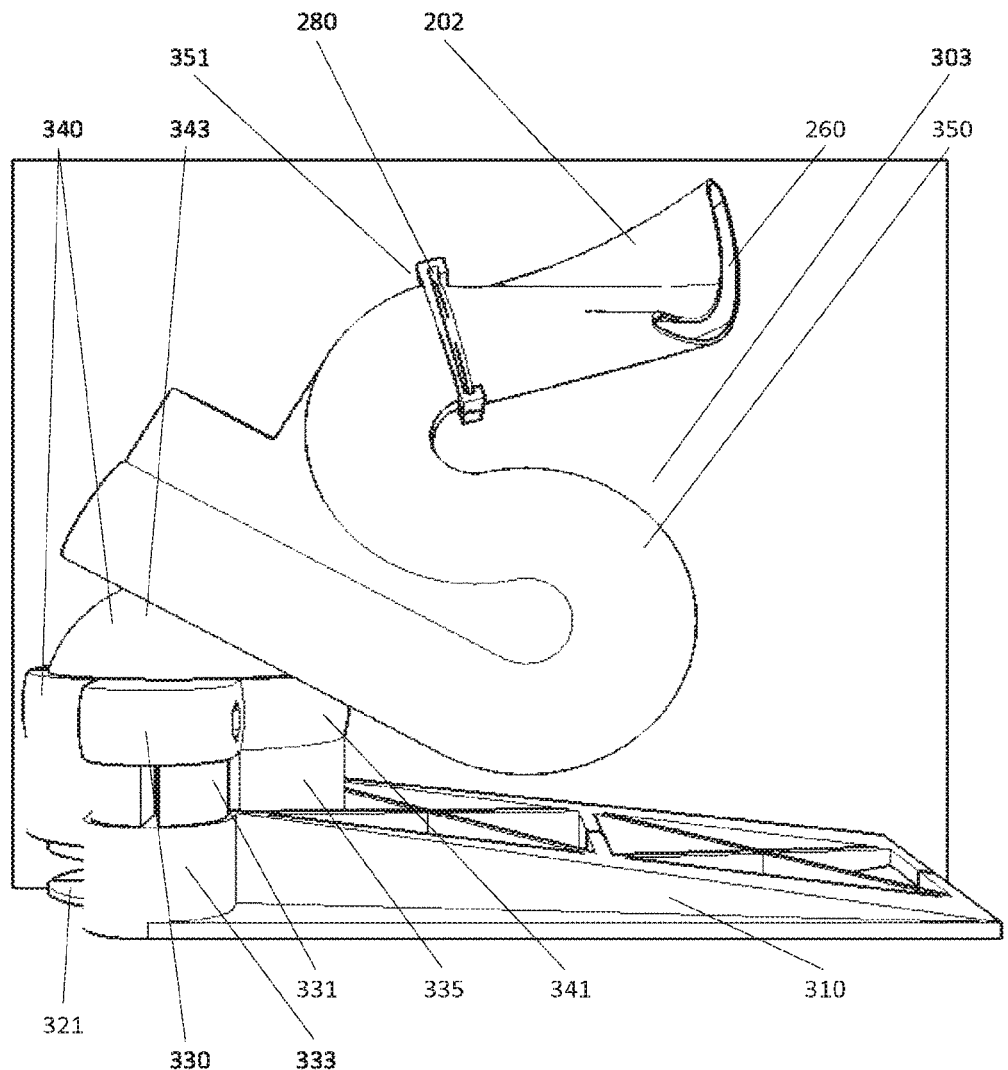
FIG. 21 is a side view of the apparatus according to the example embodiment.
Figure 22:
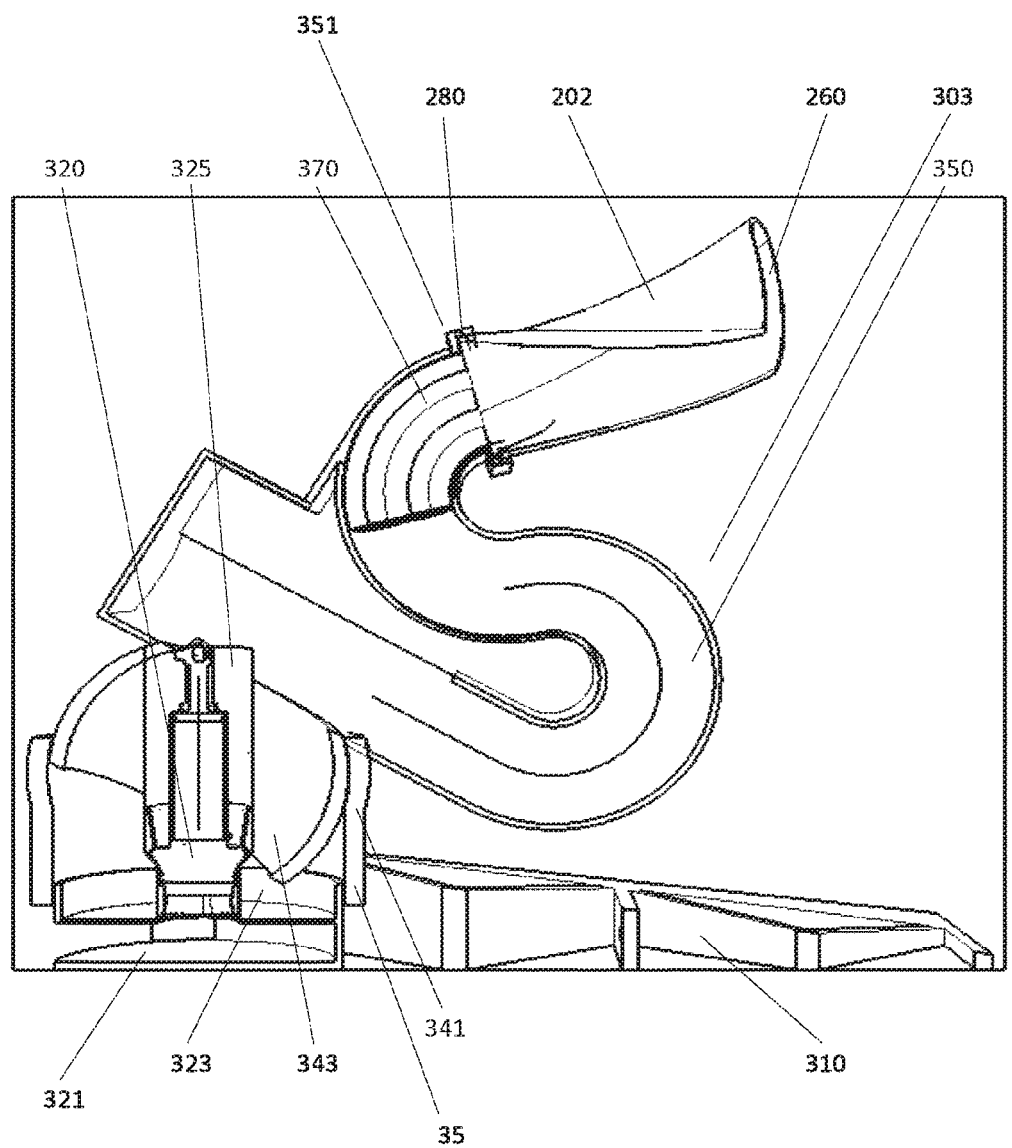
FIG. 22 is a sectional side view of the apparatus according to the example embodiment.
Figure 23:
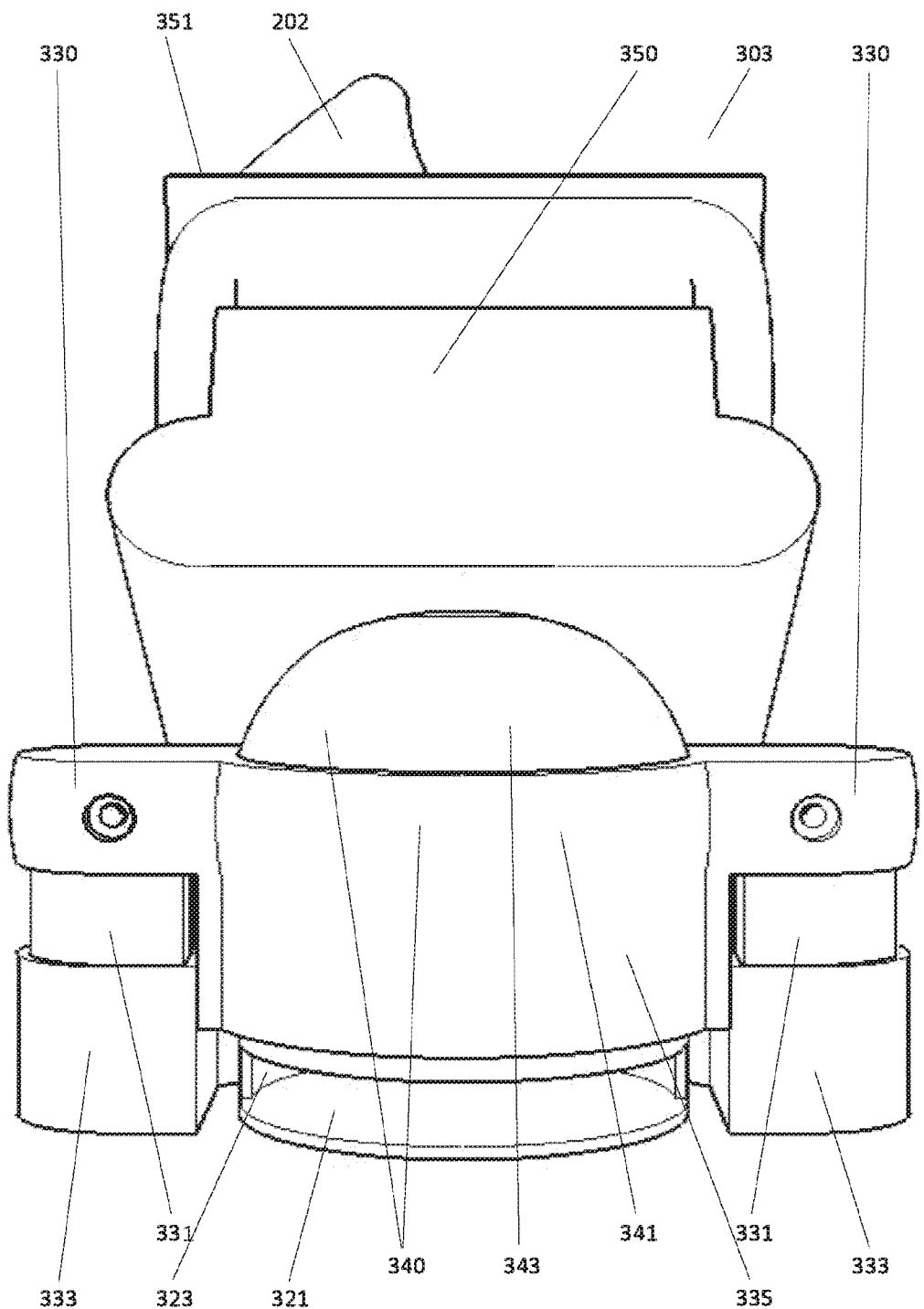
FIG. 23 is a back plan view of the apparatus according to the example embodiment.
Figure 24:
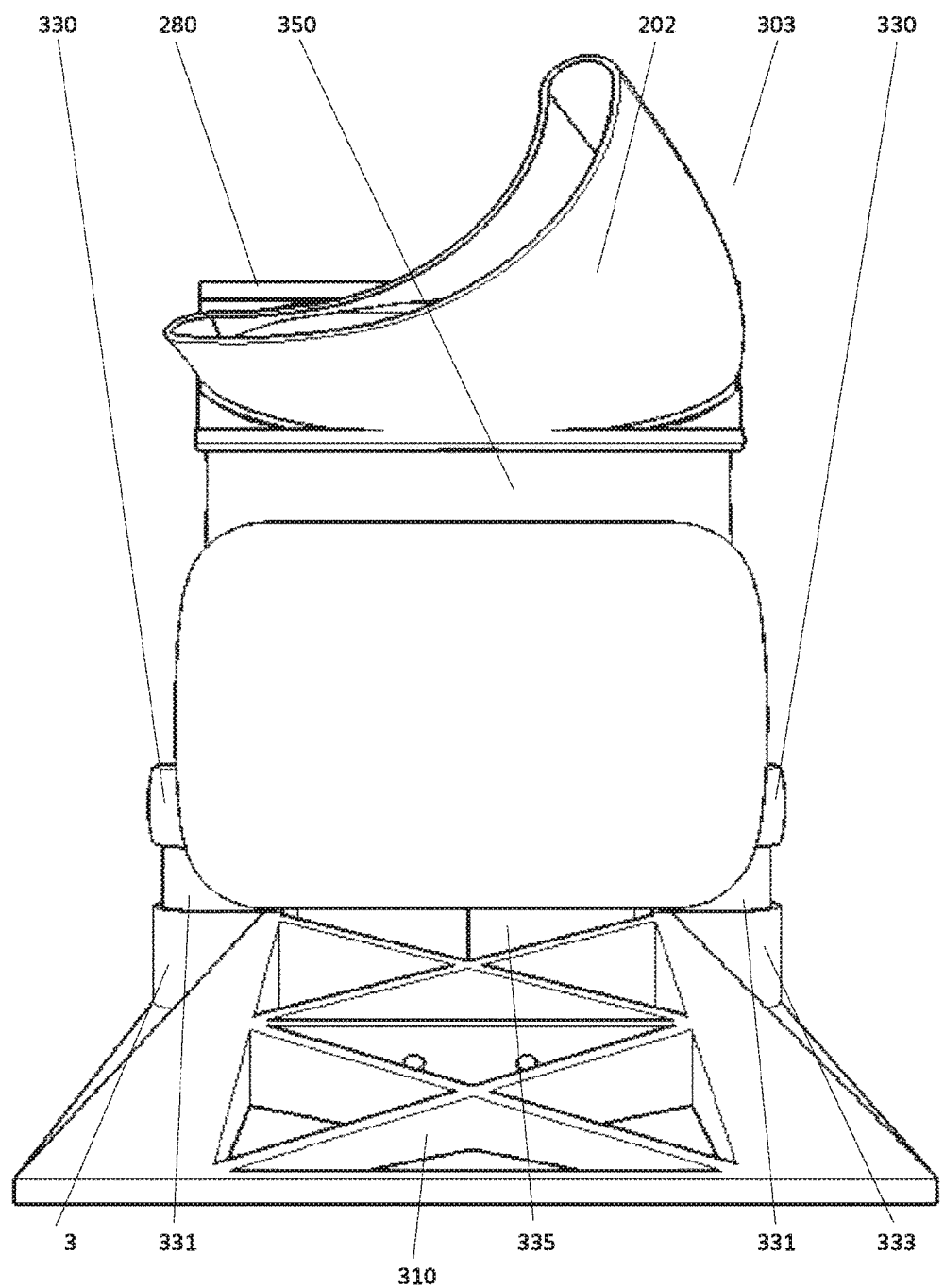
FIG. 24 is a front plan view of the apparatus according to the example embodiment.
Figure 25:
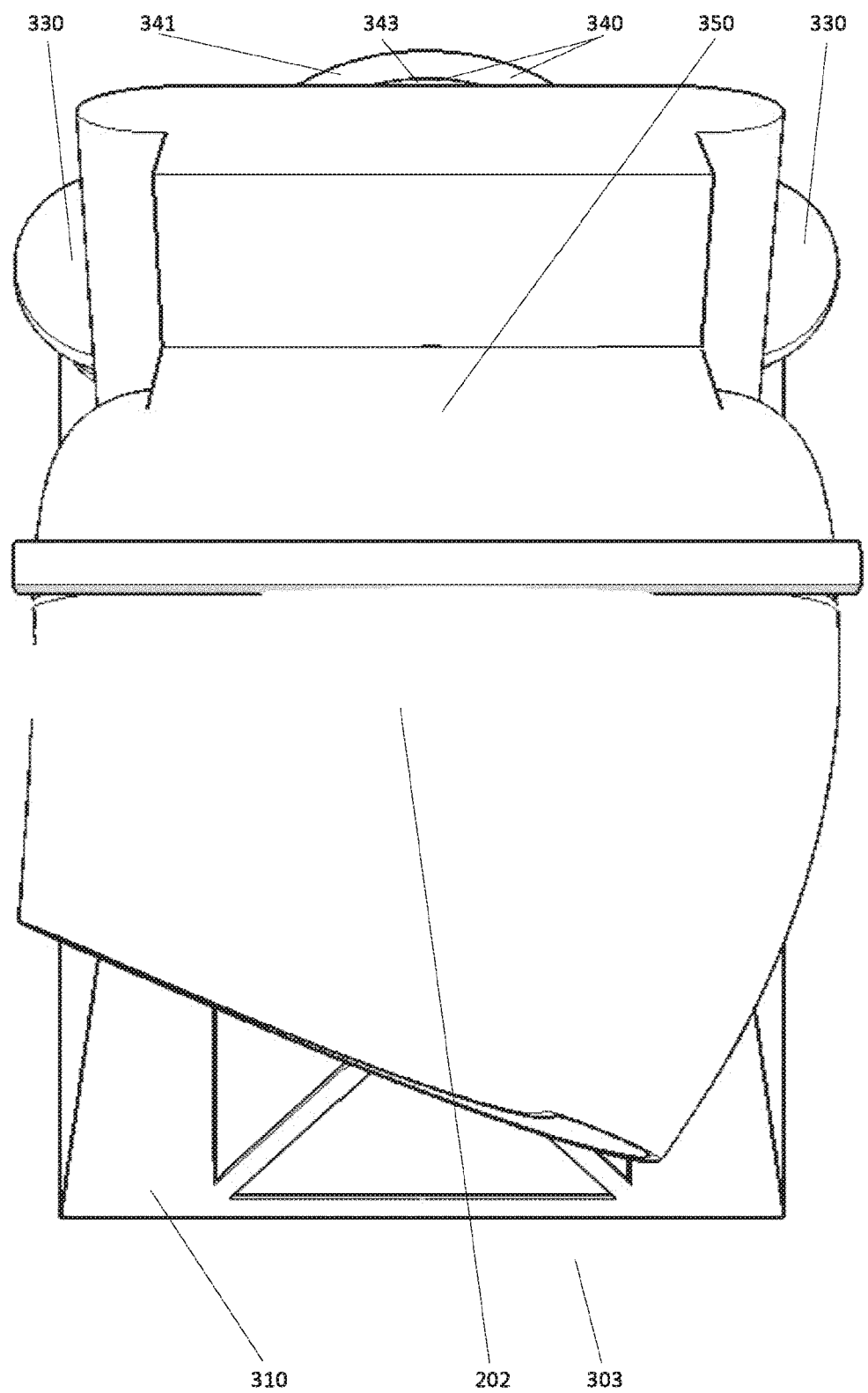
FIG. 25 is a top plan view of the apparatus according to the example embodiment.
Figure 26:
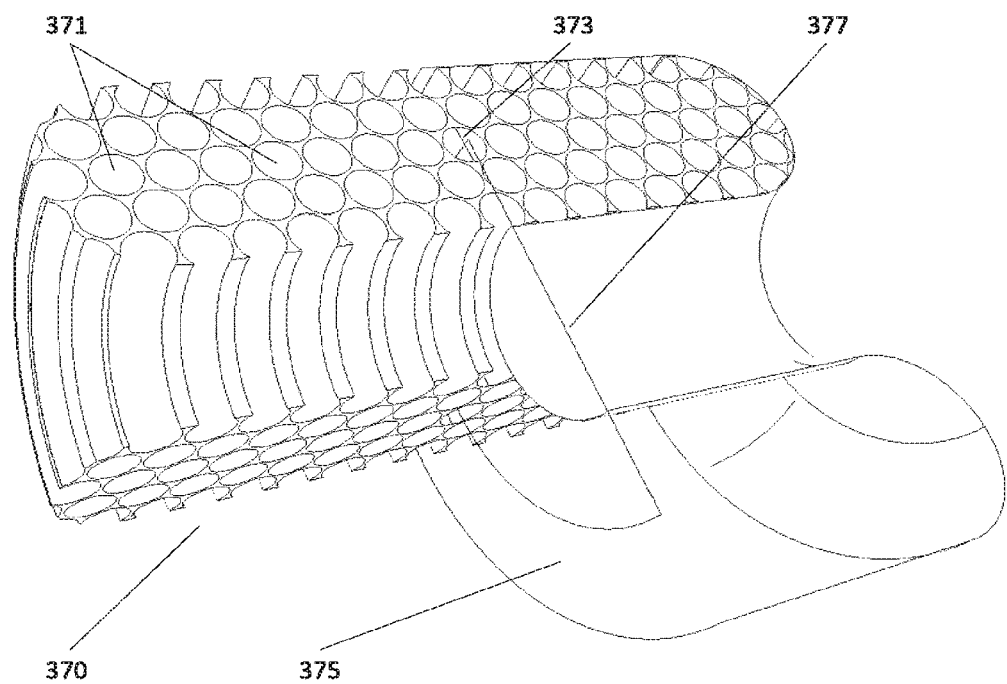
FIG. 26 is a perspective view of matrix capillaries according to the example embodiment.
Figure 27:
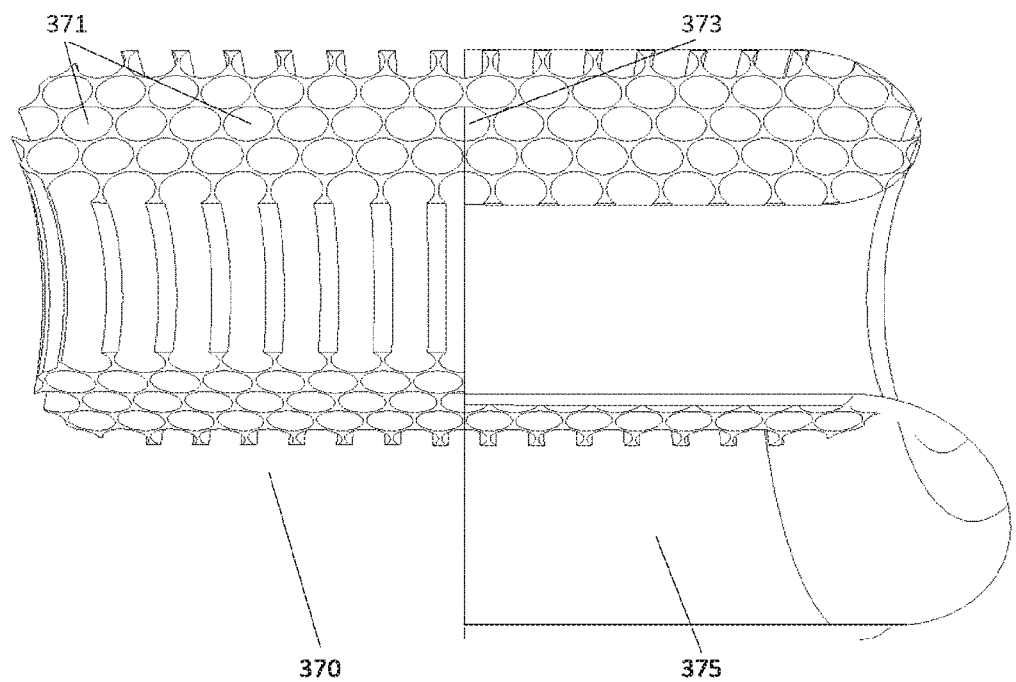
FIG. 27 is a front plan view of matrix capillaries according to the example embodiment.
Figure 28:
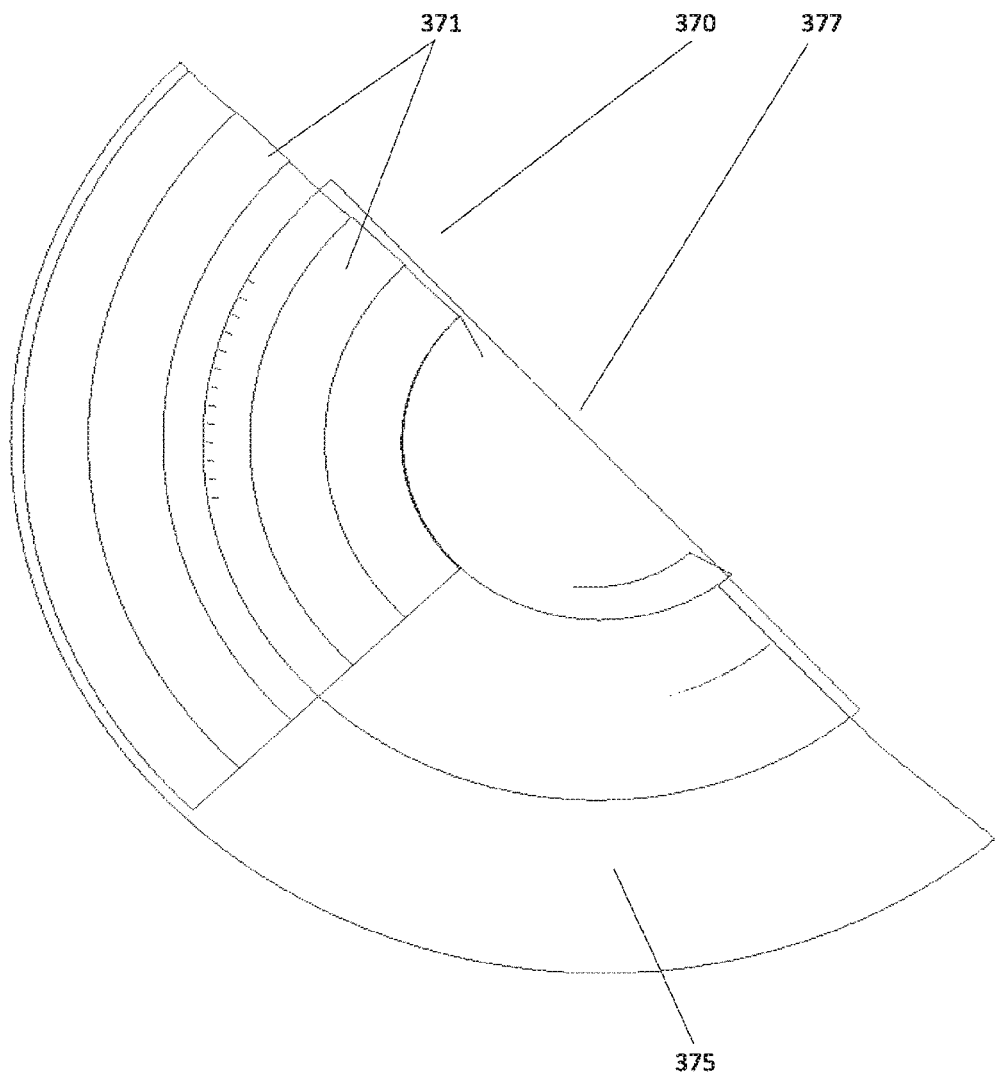
FIG. 28 is a side plan view of matrix capillaries according to the example embodiment.

As illustrated in FIGS. 20 and 22, an impeller pump 320 is used to urge a continuous flow of water though the apparatus 202, allowing the apparatus 202 to generate a continuously flowing, stationary wave 101.

As illustrated in FIGS. 18 through 25, in this example embodiment, the apparatus 202 and its parts are mounted to a pedestal 310 that rests on the floor of the water body 404 and acts as a level base for the impeller pump 320, which is required to remain in a vertical position.

As illustrated in FIGS. 20 and 22, in this example embodiment, the pump 320 is seated a in discharge column 325 that is mounted to the top of the pump's 320 intake chamber 321. The casing 323 of the intake chamber 321 extends up past the base of the discharge 325 column, with the purpose of mating with the sleeve 335 of the apparatus 202 height adjustment mechanism 330, as will be discussed later. The casing 323 of the intake chamber 321 is connected to the pedestal 310 of the apparatus 202.

As illustrated in FIGS. 18, 20, and 22, in this example embodiment, the pump 320 draws water from the water body 404 through the intake chamber 321 into the chamber 350 of the apparatus 202. In this example, the intake chamber 321 can be fitted with a protective screen or grate for safety as well as to prevent obstruction. In this example, the intake chamber 321 draws water from the opposite direction of the generated wave form 101. Alternatively, in some embodiments it may be beneficial for the intake chamber 321 to draw water from another direction. Alternatively, in some embodiments it may be beneficial for the intake chamber's 321 direction of intake to be adjustable, creating the ability for the intake chamber 321 to rotate up to 360 degrees, to create and/or modify a current in the water body 404 for the purpose of safety and/or for the purpose of augmenting the wave form 101.

As illustrated in FIGS. 19, 21, 23, and 24, in the example embodiment, the pedestal 310 also contains four support casings 333 that mate the pedestal 320 of the apparatus 202 to the four pillars 331 of the apparatus' 202 height adjustment mechanism 330. The four pillars 331 adjust up and down, in the support casings 333. This adjustment can be achieved mechanically, hydraulically, pneumatically or as preferred.

The height adjustment mechanism 330 is included in the design of the example embodiment for a number reasons. When operating in a small body of water 404 relative to the size of the apparatus 202, the displacement of water from the water body 404 into the generated wave form 101, results in a reduction to the water level in the water body 404. The height adjustment mechanism 330 adjusts the apparatus' 202 heights relative to the surface level of the water body 404, to account for this displacement. An added benefit to enabling the apparatus 202 to adjust relative to the surface 410 of the water body 404 is the increased ability to modify the form of the generated wave by adjusting the depth at which the outflow interacts with the water body 404, for example by plunging the outflow deeper into the body of water 404 to create a deeper, more pronounced trough 135 and hydraulic jump 139. Further, it's a necessity of the height adjustment mechanism 330 that the apparatus 202 need be raised and lowered to account for the change in apparatus 202 height due to adjustments of the apparatus 202 ball joint 340, as will be discussed further.

As illustrated in FIGS. 19, 21, 23, and 24, in the example embodiment, the height adjustment mechanism 330 connects the pedestal 310 of the apparatus 202 to the chamber 350 of the apparatus 202 by use of a ball joint 340. The ball joint 340 allows the apparatus 202 and chamber 350 to pivot smoothly within a limited range, in all directions. The purpose for the inclusion of a ball joint 340 in the design is to add further adjustability and variety to the generated wave form 101 of the apparatus 202. Although the active edges and surfaces of the apparatus 202 can be designed to be adjustable, it is quite beneficial to also be able to articulate the entirety of the apparatus 202, as well.

As illustrated in FIGS. 19 through 23, and 25, the ball joint 340 is comprised of a ball 343 and a socket 341, where the ball 343 is secured to the chamber 350 of the apparatus 202 and the socket 341 makes up a part the height adjustment mechanism 330. The socket 341 of the height adjustment mechanism 330 extends down to form a sleeve 335 that mates with the casing 323 of the previously discussed intake chamber 321. As illustrated, the pump's 320 discharge column 325 extends up through the sleeve 335 and the ball joint 340 of the height adjustment mechanism 330 so that the interior of the ball 343, socket 341, and sleeve 335 become part of the pressurized chamber 350. The purpose for this configuration is to allow the pump 320 to remain in a vertical position while pressurizing the chamber 350 as it both moves in an up and down motion, and pivots within a limited range, in all directions.

In some embodiments, it may prove beneficial to secure ball joint adjuster arms to the pedestal 310 and chamber 350, to more efficiently articulate the movement of the apparatus 202.

As illustrated in FIGS. 18 through 15, in this example embodiment, the chamber 350 acts as a connector between the pedestal 310 and pump 320 and the apparatus 202, itself. In this embodiment, the chamber 350 also serves as a duct for converting the turbulent pump 320 inflow into laminar outflow.

It is beneficial for the outflow of the apparatus 202 to remain in a laminar state, so that cleaner, glassier, more aesthetically pleasing wave forms 101 can be generated. Some exemplary embodiments of the apparatus require the flow at the inlet 220 to be laminar whereas some exemplary embodiments do not require the primary flow 150 at the inlet 220 to be laminar, as these embodiments are capable of transitioning the flow from turbulent to laminar in the passage 240 between the inlet 220 and outlet 260 of the apparatus 202.

Fluid flow in pipes is characterized by a non-dimensional number called the Reynolds number (Re). Up to Re 2000, fluid flow is classified as laminar or streamline. Above 10,000, flow is classified as turbulent or fully developed. The region between 2,000 Re and 10,000 Re is referred to as transitional. The Reynolds number at which turbulent flow starts is called the critical Reynolds number. In a straight pipe, the critical Reynolds number at which flow becomes turbulent is only approximately 2100; however, the critical Reynolds number for flow in a pipe can be drastically increased by coiling a length of the pipe, applying the Dean effect.

As illustrated in FIGS. 18 through 22, in this embodiment, to assist in the conversion from turbulent to laminar flow, the chamber 350 is formed in the shape of an S-curve. The final 90-degree curve 375 in the chamber's 350 shape contains a bank of matrix capillaries 370, where the inside capillary diameter 373 of each capillary 371 is approximately ⅛th of the mean coil diameter 377 of the chamber's S-curve.

In alternate embodiments, the chamber 350 may be designed in any shape and size necessary to obtain a laminar flow and required aesthetic.

In some exemplary embodiments of the apparatus 202, the chamber 350, or parts thereof, are designed in accordance with geometries found in nature, for example the geometries of the interior and or exterior edges of shells, for example, as illustrated in FIGS. 16 and 17, such as that of the phylum Mollusca; Gastropoda, Bivalvia, or Cephalopoda. In some exemplary embodiments, the chamber 350, or parts thereof, are designed in accordance with the geometry of the golden section.

As illustrated in FIGS. 18 through 24, in the example embodiment, a flange comprised of the chamber 350 female flange element 351 and the apparatus male flange element 280, connects the apparatus 202 to the chamber 350. This enables a variety of embodiments of the apparatus 202 to be quickly and easily interchanged and used with a single chamber 350. In this embodiment a slotted or tongue and groove channel flange is preferred. Alternately, a bolt on flange or clamp flange may be better suited in certain situations.

Thus, there has been described a method and apparatus for generating a wave in a body of water by altering a flow of water as it is urged through an inlet, contoured passage and outlet, for example wherein a primary flow of the water is altered so that one or more secondary flows are created at angles to the direction of primary flow. While non-limiting, exemplary embodiments have been described and illustrated, those skilled in the art will recognize that many other alternatives, variations, adaptations, and applications fall within the scope and spirit of the invention as claimed herein.

The invention claimed is:

1. A method for generating a wave in a body of water comprising:
   a. urging water to flow through an inlet, a contoured passage, and an outlet of an apparatus, and
   b. altering a primary flow of the water with at least one of active edges or active surfaces of at least one of the inlet, the contoured passage, or the outlet, wherein the outlet includes a curved face and a trough shaping edge configured to be convex relative to the primary flow, such that the water flows out of the outlet in a wave form.

2. The method of claim 1, wherein altering the flow includes altering the flow with active edges and surfaces of an outer shell that encases the inlet, contoured passage, and outlet.

3. The method of claim 2, further comprising obstructing, with active edges and surfaces of the outer shell, unwanted flow from the body of water from impeding the water flowing out of the outlet.

4. The method of claim 1, wherein urging water through the contoured passage includes urging water through a plurality of internal passages.

5. The method of claim 1, further including modifying the generated wave form by varying a volumetric rate of flow that is urged through.

6. The method of claim 1, further including modifying the generated wave form by adjusting the active edges and surfaces of at least one of the inlet, the contoured passage, or the outlet.

7. The method of claim 1, further including modifying the generated wave form by articulating the apparatus in at least one direction.

8. The method of claim 1, wherein the apparatus is at least partially submerged in the body of water, the method further comprising modifying the generated wave form through interaction with the body of water.

9. The method of claim 1, wherein urging includes urging at least a portion of the primary flow through the active edges and surfaces of at least one of the inlet, the contoured passage, or the outlet of the apparatus which are configured to alter a portion of the primary flow into becoming a face and a trough of the wave form.

10. The method of claim 1, wherein altering includes:
    altering by active edges and surfaces that make up the inlet, passage, and outlet, or parts thereof, which are designed in accordance with the geometry of a logarithmic spiral;
    altering by active edges and surfaces that make up the inlet, passage, and outlet, or parts thereof, which are designed in accordance with geometries of the interior edges and surfaces of shells selected from the phylum Mollusca: Gastropoda, Bivalvia, or Cephalopoda; or
    altering by active edges and surfaces that make up the inlet, passage, and outlet, or parts thereof, which are designed in accordance with the geometry of the golden section.

11. The method of claim 1, wherein urging includes urging at least a portion of the primary flow through the active edges and surfaces of at least one of the inlet, the contoured passage, or the outlet that are configured to alter the primary flow so that the wave form resembles a horizontal ring vortex or spiral fluid pathway.

12. The method of claim 1, wherein urging includes urging at least a portion of the primary flow through the active edges and surfaces of at least one of the inlet, the contoured passage, or the outlet of the apparatus and displacing a volume of the body of water as the water flows out of the outlet and interacts with the body of water so that a hydraulic jump is generated in the body of water.

13. The method of claim 1, wherein urging includes urging at least a portion of the primary flow through the active edges and surfaces of at least one of the inlet, the contoured passage, or the outlet that are configured to urge a portion of the primary flow into a form that makes up an outer barrel flow path, which plunges over an inner barrel flow path or face and trough of the wave form, and into a break zone.

14. The method of claim 1, wherein urging includes urging the water to flow through the apparatus while the apparatus remains stationary in the body of water.

15. The method of claim 1, wherein urging includes urging the water to flow through the apparatus as the apparatus is moved through the body of water.

16. The method of claim 1, wherein urging includes urging from a chamber having a chamber inlet and a chamber outlet to make turbulent flow laminar.

17. The method of claim 16, wherein altering includes altering by a section of the chamber nearest the outlet which is formed in a shape of a curve.

18. The method of claim 17, wherein altering includes altering with a bank of matrix capillaries within the chamber, wherein an inside capillary diameter of each capillary is less than a mean coil diameter of the chamber's curve.

19. The method of claim 18, wherein altering includes altering with matrix capillaries having an inside capillary diameter of between ⅕th and 1/50th of the mean coil diameter of the chamber's curve.

20. The method of claim 1, wherein urging includes urging at least a portion of a primary flow through the active edges and surfaces of at least one of the inlet, the contoured passage, or the outlet that are configured to alter the primary flow so that at least one secondary flow is created at an angle to a direction of the primary flow.

21. The method of claim 1, wherein the contoured passage connects the inlet to the outlet and has a varying cross-sectional shape along a length of the contoured passage.

22. The method of claim 1, wherein the curved face and trough shaping edge includes a middle portion and first and second outer portions, the middle portion disposed between the first and second outer portions, the middle portion being below the first and second outer portions when the outlet is configured to alter the primary flow into the wave form.

23. The method of claim 1, wherein the inlet and the outlet have different shapes, and a cross-sectional shape of the contoured passage gradually changes from the inlet to the outlet.

24. An apparatus for generating a wave in a body of water comprising:
    a. an inlet configured to receive a primary flow,
    b. an outlet configured to discharge a wave form, and
    c. a contoured passage connecting the inlet to the outlet, wherein at least one of the inlet, the outlet or the contoured passage is configured to alter the primary flow into the wave form;
    wherein at least one of the inlet, the outlet, or the contoured passage includes active edges and surfaces configured to alter a portion of the primary flow into becoming a face and a trough of the wave form, and wherein the outlet includes a curved face and a trough shaping edge configured to be convex relative to the primary flow.

25. The apparatus of claim 24, wherein the apparatus further comprises an outer shell that encases the inlet, the contoured passage, and the outlet.

26. The apparatus of claim 25, wherein the outer shell has additional active edges and surfaces which are configured to obstruct unwanted flow of the body of water from impeding the wave form.

27. The apparatus of claim 24, wherein the contoured passage comprises a plurality of passages connecting the inlet to the outlet.

28. The apparatus of claim 24, wherein the apparatus is configured to articulate in at least one direction.

29. The apparatus of claim 24, wherein the active edges and surfaces of at least one of the inlet, the contoured passage, or the outlet comprise:
    a. an inlet edge;
    b. outlet edge including the trough shaping edge; and
    c. a passage surface connecting the inlet to the outlet.

30. The apparatus of claim 29, further including a passage profile, wherein the outlet edge is curved in toward the passage profile.

31. The apparatus of claim 30, wherein a curvature of the passage surface diminishes as it moves away from the outlet.

32. The apparatus of claim 29, wherein the passage surface follows a curved path from the inlet to the outlet.

33. The apparatus of claim 29, wherein the active edges and surfaces, or parts thereof, are designed in accordance with:
- the geometry of a logarithmic spiral;
- geometries of the interior edges and surfaces of shells selected from the phylum Mollusca: Gastropoda, Bivalvia, or Cephalopoda; or
- the geometry of the golden section.

34. The apparatus of claim 29, wherein the active edges and surfaces of at least one of the inlet, the contoured passage, or the outlet are configured to alter the primary flow so that the wave form resembles a horizontal ring vortex or spiral fluid pathway.

35. The apparatus of claim 29, wherein the active edges and surfaces of at least one of the inlet, the contoured passage, or the outlet are configured to alter the primary flow so that a hydraulic jump is generated in the body of water as the wave form exits the outlet and interacts with the body of water.

36. The apparatus of claim 29, wherein the active edges and surfaces of at least one of the inlet, the contoured passage, or the outlet are configured to urge a portion of the primary flow into a form that comprises an outer barrel flow path that plunges over an inner barrel flow path or face and trough of the wave form, and into a break zone.

37. The apparatus of claim 24, further including a chamber having a chamber inlet and chamber outlet, wherein the inlet of the apparatus is coupled to the chamber outlet.

38. The apparatus of claim 37, wherein a section of the chamber nearest the chamber outlet is formed in a shape of a curve.

39. The apparatus of claim 38, wherein the chamber contains a bank of matrix capillaries wherein an inside capillary diameter of each capillary is less than of a mean coil diameter of the chamber's curve.

40. The apparatus of claim 39, wherein the inside capillary diameter of each capillary in the matrix capillaries is between ½ and 1/50 of the mean coil diameter of the chamber's curve.

41. The apparatus of claim 37, further comprising a water pump with a discharge column, having an intake and outlet, wherein at least the intake resides in the body of water.

42. The apparatus of claim 41, further comprising a mechanism for adjusting a height of the chamber.

43. The apparatus of claim 24, wherein the contoured passage connects the inlet to the outlet and has a varying cross-sectional shape along a length of the contoured passage.

44. The apparatus of claim 24, wherein the curved face and trough shaping edge includes a middle portion and first and second outer portions, the middle portion disposed between the first and second outer portions, the middle portion being below the first and second outer portions when the outlet is configured to alter the primary flow into the wave form.

45. The apparatus of claim 24, wherein the inlet and the outlet have different shapes, and a cross-sectional shape of the contoured passage gradually changes from the inlet to the outlet.

46. The method of claim 24, wherein urging includes urging at least a portion of a primary flow through the active edges and surfaces of at least one of the inlet, the contoured passage, or the outlet that are configured to alter the primary flow so that at least one secondary flow is created at an angle to a direction of the primary flow.

47. A method for generating a wave in a body of water, the method comprising:
- a. urging water to flow through an inlet, a contoured passage and an outlet of an apparatus, and
- b. altering a primary flow of the water with at least one of active edges or active surfaces of at least one of the inlet, the contoured passage, or the outlet, wherein the outlet includes a curved face and a trough shaping edge configured to be convex relative to the primary flow, such that the water flows out of the outlet in a wave form; wherein urging includes urging at least a portion of a primary flow through the active edges and surfaces of at least one of the inlet, the contoured passage, or the outlet of the apparatus which are configured to alter a portion of the primary flow into becoming a face and a trough of the wave form.

48. An apparatus for generating a wave in a body of water, the apparatus comprising:
- a. an inlet configured to receive a primary flow,
- b. an outlet configured to discharge a wave form, and
- c. a contoured passage connecting the inlet to the outlet, wherein at least one of the inlet, the outlet or the contoured passage is configured to alter the primary flow into the wave form;

wherein at least one of the inlet, the outlet, or the contoured passage includes active edges and surfaces configured to alter a portion of the primary flow into becoming a face and a trough of the wave form, and wherein the active edges and surfaces of at least one of the inlet, the contoured passage, or the outlet comprise:
- a. an inlet edge;
- b. outlet edge including a trough shaping edge configured to be convex relative to the primary flow; and
- c. a passage surface connecting the inlet to the outlet.

* * * * *